United States Patent
Shattil

(10) Patent No.: US 11,671,151 B2
(45) Date of Patent: Jun. 6, 2023

(54) EFFICIENT PEAK-TO-AVERAGE-POWER REDUCTION FOR OFDM AND MIMO-OFDM

(71) Applicant: Genghiscomm Holdings, LLC, Boulder, CO (US)

(72) Inventor: Steve Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 380 days.

(21) Appl. No.: 16/307,039

(22) PCT Filed: Jul. 24, 2018

(86) PCT No.: PCT/US2018/043573
§ 371 (c)(1),
(2) Date: Dec. 4, 2018

(87) PCT Pub. No.: WO2019/023283
PCT Pub. Date: Jan. 31, 2019

(65) Prior Publication Data
US 2021/0226834 A1    Jul. 22, 2021

Related U.S. Application Data

(60) Provisional application No. 62/536,955, filed on Jul. 25, 2017.

(51) Int. Cl.
*H04L 27/26* (2006.01)
*H04B 7/0456* (2017.01)

(52) U.S. Cl.
CPC ....... *H04B 7/0456* (2013.01); *H04L 27/2615* (2013.01); *H04L 27/2634* (2013.01); *H04L 27/2642* (2013.01); *H04L 27/26362* (2021.01)

(58) Field of Classification Search
CPC ............. H04L 27/2615; H04L 27/2621; H04L 27/2634; H04L 27/26362; H04L 27/2642; H04B 7/0456; Y02D 30/70
See application file for complete search history.

(56) References Cited

U.S. PATENT DOCUMENTS 5,955,992 A   9/1999   Shattil
6,686,879 B2  2/2004   Shattil
(Continued)

FOREIGN PATENT DOCUMENTS

KR   10-20090033703   8/2011
WO   2019023283      1/2019

OTHER PUBLICATIONS

Written Opinion dated Nov. 5, 2018 from corresponding PCT Application No. PCT/US2018/043573.
(Continued)

*Primary Examiner* — Siu M Lee
(74) *Attorney, Agent, or Firm* — Steven J Shattil

(57) ABSTRACT

Certain aspects of the present disclosure generally relate to wireless communications. In some aspects, a wireless device reduces a peak-to-average power ratio (PAPR) of a discrete-time orthogonal frequency division multiplexing (OFDM) transmission by selecting a signal with low PAPR from a set of candidate discrete-time OFDM signals. The wireless device may generate a partial-update discrete-time OFDM signal by performing a sparse transform operation on a base data symbol sequence, and then linearly combine the partial-update discrete-time OFDM signal with a base discrete-time OFDM signal to produce an updated discrete-time OFDM signal, which is added to the set of candidate discrete-time OFDM signals. Numerous other aspects are provided.

21 Claims, 6 Drawing Sheets

(56) References Cited

U.S. PATENT DOCUMENTS

| | | | |
|---|---|---|---|
| 7,010,048 B1 | 3/2006 | Shattil | |
| 7,076,168 B1 | 7/2006 | Shattil | |
| 7,286,604 B2 | 10/2007 | Shattil | |
| 7,317,750 B2 | 1/2008 | Shattil | |
| 7,391,804 B2 | 6/2008 | Shattil | |
| 7,406,261 B2 | 7/2008 | Shattil | |
| 7,418,043 B2 | 8/2008 | Shattil | |
| 7,430,257 B1 | 9/2008 | Shattil | |
| 7,787,514 B2 | 8/2010 | Shattil | |
| 8,374,074 B2 * | 2/2013 | Liao | H04L 27/2621 370/480 |
| 8,670,390 B2 | 3/2014 | Shattil | |
| 8,885,628 B2 | 10/2014 | Palanki et al. | |
| 8,929,550 B2 | 1/2015 | Shattil | |
| 8,942,082 B2 | 1/2015 | Shattil | |
| 9,225,471 B2 | 12/2015 | Shattil | |
| 9,485,063 B2 | 11/2016 | Shattil | |
| 9,628,231 B2 | 4/2017 | Shattil | |
| 9,693,339 B2 | 6/2017 | Palanki et al. | |
| 9,798,329 B2 | 10/2017 | Shattil | |
| 10,243,773 B1 * | 3/2019 | Shattil | H04L 27/2628 |
| 10,447,520 B1 * | 10/2019 | Shattil | H04B 7/0465 |
| 10,505,774 B1 * | 12/2019 | Shattil | H04L 27/2614 |
| 10,728,074 B1 * | 7/2020 | Shattil | H04L 27/2614 |
| 10,985,961 B1 * | 4/2021 | Shattil | H04L 27/2628 |
| 11,196,603 B2 * | 12/2021 | Shattil | H04L 27/2634 |
| 2005/0265293 A1 | 12/2005 | Ro et al. | |
| 2006/0034378 A1 | 2/2006 | Lindskog et al. | |
| 2006/0245346 A1 | 11/2006 | Bar-Ness et al. | |
| 2006/0262870 A1 | 11/2006 | Khan | |
| 2007/0183386 A1 | 8/2007 | Muharemovic et al. | |
| 2007/0211807 A1 | 9/2007 | Han et al. | |
| 2008/0095121 A1 | 4/2008 | Shattil | |
| 2009/0147870 A1 | 6/2009 | Lin et al. | |
| 2009/0274103 A1 | 11/2009 | Yang et al. | |
| 2009/0304108 A1 | 12/2009 | Kwon et al. | |
| 2010/0110875 A1 | 5/2010 | No et al. | |
| 2010/0165829 A1 | 7/2010 | Narasimha et al. | |
| 2011/0096658 A1 | 4/2011 | Yang et al. | |
| 2011/0122930 A1 * | 5/2011 | Al-Naffouri | H04L 27/2618 375/296 |
| 2011/0206207 A1 | 8/2011 | Priotti | |
| 2011/0281534 A1 | 11/2011 | Liao et al. | |
| 2012/0224517 A1 | 9/2012 | Yun et al. | |
| 2012/0294346 A1 | 11/2012 | Kolze | |
| 2014/0198863 A1 | 7/2014 | Terry | |
| 2015/0103723 A1 | 4/2015 | Kim et al. | |
| 2015/0195840 A1 | 7/2015 | Ahn et al. | |
| 2015/0271000 A1 | 9/2015 | Yang et al. | |
| 2015/0304153 A1 | 10/2015 | Moffatt et al. | |
| 2015/0358190 A1 | 12/2015 | Kruglick et al. | |
| 2016/0050096 A1 | 2/2016 | DelMarco | |
| 2016/0050099 A1 | 2/2016 | Siohan et al. | |
| 2016/0197756 A1 | 7/2016 | Mestdagh et al. | |
| 2016/0254889 A1 | 9/2016 | Shattil | |
| 2016/0269083 A1 | 9/2016 | Porat et al. | |
| 2016/0344497 A1 | 11/2016 | Myung et al. | |
| 2016/0353446 A1 | 12/2016 | Abdoli et al. | |
| 2017/0019284 A1 | 1/2017 | Ankarali et al. | |
| 2017/0054584 A1 * | 2/2017 | Madaiah | H04L 27/2634 |
| 2017/0126454 A1 | 5/2017 | Huan et al. | |
| 2017/0134202 A1 | 5/2017 | Baligh et al. | |
| 2017/0134235 A1 | 5/2017 | Wu et al. | |
| 2017/0250848 A1 | 8/2017 | Lee et al. | |
| 2017/0264474 A1 | 9/2017 | He et al. | |
| 2017/0279648 A1 | 9/2017 | Song et al. | |
| 2017/0353340 A1 | 12/2017 | Raphaeli et al. | |
| 2018/0062904 A1 | 3/2018 | Hwang et al. | |
| 2018/0091338 A1 | 3/2018 | Mayer et al. | |
| 2018/0109408 A1 * | 4/2018 | Sandell | H04L 27/2614 |
| 2018/0167244 A1 | 6/2018 | Cheng et al. | |
| 2018/0191543 A1 | 7/2018 | Park et al. | |
| 2018/0212810 A1 | 7/2018 | Park et al. | |
| 2022/0060363 A1 * | 2/2022 | Shattil | H04B 7/0465 |

OTHER PUBLICATIONS

International Search Report dated Nov. 5, 2018 from corresponding PCT Application No. PCT/US2018/043573.

Extended European Search Report dated Mar. 18, 2021 from corresponding EPO Application No. 18837572.9.

Examination Report, India Patent Office, dated Jul. 26, 2021 from corresponding India Application No. 202047007281.

H. Prakash, C.D.Suriyakala; "PAPR Reduction in MIMO SC-FDMA—A Survey"; Int. J Rec. Adv. Sci. Tech., 2015; 2(2):11-19.

E. Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.

J. Shin, B. Seo; "PAPR Reduction Scheme for MISO and MIMO OFDM Systems with Limited Feedback"; WSEAS Transactions on Communications 13:355-362 • Jan. 2014.

D. Sinanovic, et al.; "Low PAPR Spatial Modulation for SC-FDMA"; IEEE Transactions on Vehicular Technology; vol. 66, Issue: 1, Jan. 2017.

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.

M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.

M. Vu, A. Paulraj; "MIMO Wireless Linear Precoding"; IEEE Signal Processing Magazine. Submitted Feb. 2006, revised Nov. 2006 and Dec. 2006.

H.G. Myung, et al.; "Peak Power Characteristics of Single Carrier FDMA MIMO Precoding System"; 2007 IEEE 66th Vehicular Technology Conference, Sep. 30-Oct. 3, 2007.

B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.

A.S. Parihar, A. Rai; "A Review: PAPR Reduction Techniques in MIMO OFDM System"; International Journal of Engineering and Innovative Technology (IJEIT); vol. 4, Issue 12, Jun. 2015.

B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).

C. A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.

K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.

K. Srinivasarao, et al.; "Peak-to-Average Power Reduction in MIMO-OFDM Systems Using Sub-Optimal Algorithm"; International Journal of Distributed and Parallel Systems (IJDPS) vol. 3, No. 3, May 2012.

K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.

H. Zhang, D.L. Goeckel; "Peak Power Reduction in Closed-Loop MIMO-OFDM Systems via Mode Reservation"; IEEE Communications Letters, vol. 11, No. 7, Jul. 2007.

C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.

P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.

H-B Jeon, et al.; "Bit-Based SLM Schemes for PAPR Reduction in QAM Modulated OFDM Signals"; IEEE Transactions on Broadcasting, vol. 55, No. 3, Sep. 2009.

(56) References Cited

OTHER PUBLICATIONS

H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M.I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peakaverage power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM PeaktoAverage Power Reduction Without Side Information"; Proceeding of the SDR 04 Technical Conference and Product Exposition 2004, Syracuse, NY, Technology Center—Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.
D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.
B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.
C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.
C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.
B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.
Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.
S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.
B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.
Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.
B. Natarajan, C.R. Nassar, S. Shattil; "Innovative pulse shaping for high-performance wireless TDMA," Communications Letters, IEEE vol. 5, Issue 9, Sep. 2001 pp. 372-374.
B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.
LTE: Evolved Universal Terrestrial Radio Access (E-UTRA); Multiplexing and channel coding (3GPP TS 36.212 version 8.8.0 Release 8), Jan. 2010.
LTE: Evolved Universal Terrestrial Radio Access (E-UTRA); Physical channels and modulation (3GPP TS 36.211 version 8.7.0 Release 8), Jun. 2009.

\* cited by examiner

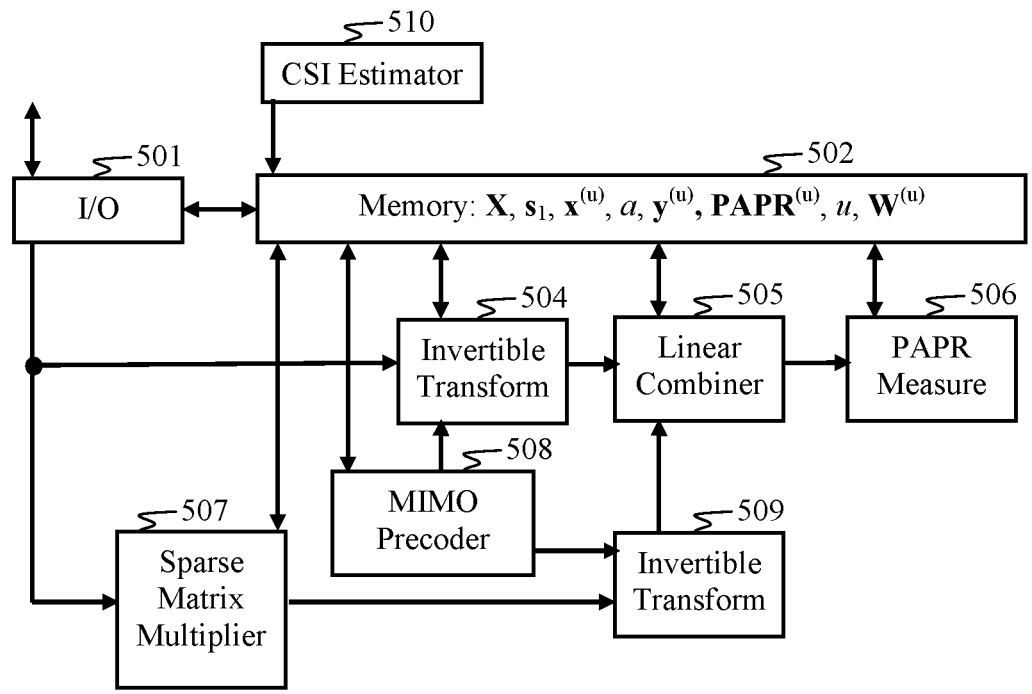
FIG. 5A
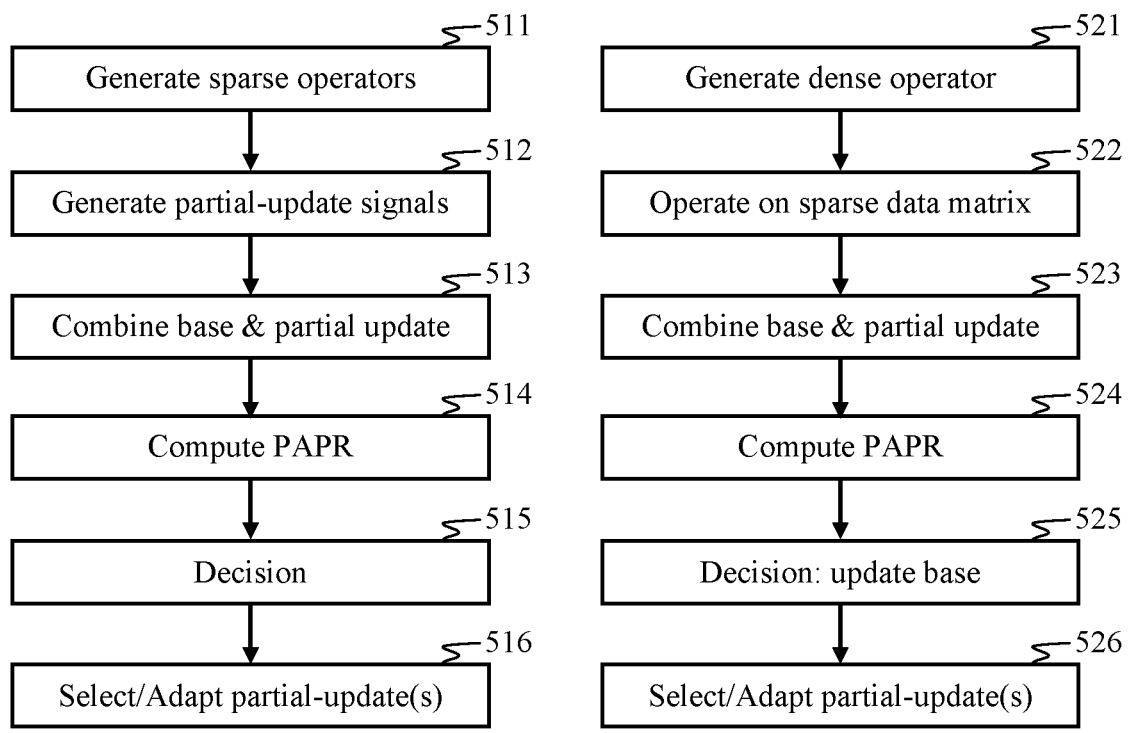
FIG. 5B
FIG. 5C

EFFICIENT PEAK-TO-AVERAGE-POWER REDUCTION FOR OFDM AND MIMO-OFDM

CROSS REFERENCE TO PRIOR APPLICATIONS

This application is a National Stage of PCT International Application No. PCT/US18/43573 entitled "EFFICIENT PEAK-TO-AVERAGE-POWER REDUCTION FOR OFDM AND MIMO-OFDM" filed Jul. 24, 2018, which claims priority to Provisional Appl. No. 62/536,955, filed Jul. 25, 2017; which are hereby expressly incorporated by reference herein.

FIELD OF THE DISCLOSURE

The following relates generally to wireless communication, and more specifically to precoding multicarrier waveforms.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication and wireless networking standards to provide a common protocol that enables different wireless devices to communicate. An example of a telecommunication standard is Long Term Evolution (LTE). LTE is a set of enhancements to the Universal Mobile Telecommunications System (UMTS) mobile standard designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

A wireless communication network may include a number of base stations that can support communication for a number of user equipment devices (UEs) and/or access terminals of various types. A UE may communicate with a base station via the downlink and uplink. The downlink (or forward link) refers to the communication link from the base station to the UE, and the uplink (or reverse link) refers to the communication link from the UE to the base station.

SUMMARY

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

Aspects disclosed herein exploit partial updates to candidate symbol sequences to enable computationally efficient reduction of an OFDM signal's Peak to Average Power Ratio (PAPR). This is applicable to various types of OFDM signals, including (but not limited to) MIMO-OFDM, spread-OFDM, SC-FDMA, and OFDMA signals. In MIMO-OFDM, a PAPR-based metric can take into account PAPR measurements across all $N_t$ of MIMO transmitters or a predetermined subset ($N_s < N_t$) of the transmitters. Parameter selection (e.g., selective mapping (SLM) symbols, spreading codes, scrambling sequences, dummy data symbols, sub-channel scheduling for PAPR-reduction symbols, etc.) can be selected corresponding to a computed "best" PAPR-based metric. PAPR's corresponding to each transmitter or antenna can be weighted by a corresponding PAPR-sensitivity scaling factor to produce the PAPR-based metric. Transmitter and/or antenna scheduling can be configured to provide a distributed MIMO antenna array with at least one transmitter or antenna with low PAPR-sensitivity to provide at least one additional degree of freedom to the optimization problem of finding a good PAPR-based metric.

Aspects disclosed herein can comprise data-independent updating schedules, data-dependent updating schedules, and combinations thereof. Data-dependent updating schedules can have faster convergence in some cases (e.g., for stationary signals) than algorithms that have data-independent updating schedules. A step size for updating the parameter(s) can be selected to improve convergence and/or stability. The step size may be constant or may be variable based on one or more measurement criteria. In some aspects, conditions on the step size are derived to provide convergence in the mean and the mean square sense.

In some aspects, the parameters to be updated in a data-independent updating schedule are chosen at random. Aspects may employ a stochastic partial update algorithm. In one example, parameters to be updated are partitioned into multiple subsets of the total set of parameters, and then the subsets are randomly selected to be updated in each iteration. In some aspects, a predetermined schedule of parameters to be updated in each iteration is provided.

Partial-update algorithms employed herein can be configured to reduce the number of computations and take into account costs for increased program and data memory. For example, the reduction in number of execution cycles might be offset by additional cycles needed for storing data in intermediate steps. A processing metric to be optimized by the algorithm can comprise any combination of these costs. While matrix vector multiplication is a memory-bound application kernel, aspects disclosed herein provide for partial-update methods adapted to discrete-time OFDM signals, which enables the generation of candidate discrete-time signals to benefit from optimization solutions used for sparse processing operations. In sparse matrix and/or vector multiplication, for example, GPU architectures can be configured for optimizing global memory access, optimizing shared memory access, and/or exploiting reuse and parallelism. Other optimizations provide for tuning configuration parameters, such as varying a number of threads per thread block used for execution, varying a number of threads handling a row.

A common technique begins with a run-time preprocessing of the sparse matrix-vector multiplication to identify and extract dense sub-blocks. However, sparse matrices disclosed in the partial-update techniques herein have well-defined structure that is known prior to run-time, which can simplify the pre-processing as well as subsequent processing.

In one aspect, let $\{x_{n,u}\}$ be an input data sequence and let $\{w_{n,u}\}$ denote coefficients of an adaptive filter of length N.

$$w_u = [w_{1,u} w_{2,u} \ldots w_{N,u}]^T$$

$$X_u = [x_{1,u} x_{2,u} \ldots x_{N,u}]^T$$

where the terms defined above are for the instant u and $(\ )^T$ denotes the transpose operator. The problem is to select $X_u$ and/or $w_u$ to obtain the OFDM signal with the lowest PAPR. In some SLM aspects, multiple candidate symbol sequences $X_u$ can be provided. SLM can be effected by multiplying the input data symbol sequence X with a phase-rotation or other complex-valued matrix $w_u$. A symbol sequence $Y_u = w_u X$ can be generated, where $w_u$ is a $u^{th}$ candidate phase-rotation matrix.

A partial transmit sequence (PTS) scheme may be used wherein phase optimization seeks the optimal combination of signal subblocks. The weight values $w_u$ may be selectable from candidate phase sequences in a weight codebook. In some aspects, dummy sequence insertion (DSI) is employed. The weight matrices $w_u$ can provide dummy symbol insertion, such as by adapting dummy symbols in resource blocks and/or layers. Dummy symbol insertion may employ sub-channels assigned for PAPR-reduction, such as spatial sub-channels or a signal space projection that is orthogonal to the signal space employed for communications. Combinations of the aforementioned PAPR-reduction techniques can be employed, such as a combination of DSI and PTS schemes. Other combinations can be employed.

In OFDM modulation, a block of N data symbols (one OFDM symbol), $\{x_n, n=1, \ldots, N\}$ is transmitted in parallel such that each symbol modulates a different subcarrier from a set $\{f_n, n=0, 1, \ldots, N\}$. The N subcarriers are orthogonal, i.e. $f_n = n\Delta f$, where $\Delta f = 1/NT$ and T is the symbol period. The complex envelope of the transmitted OFDM signal is given as:

$$x_n(t) = \frac{1}{\sqrt{N}} \sum_{n=1}^{N} X_n e^{i2\pi f_n t}$$

where $0 \leq t \leq NT$, and $X_n$ can comprise weight terms.

The PAPR of the transmitted OFDM signal can be computed from $$PAPR = \frac{\max_{0 \leq t \leq NT} |x_n(t)|^2}{E[|x_n(t)^2|]} = \frac{\max_{0 \leq t \leq NT} |x_n(t)|^2}{\frac{1}{NT} \int_0^{NT} |x_n(t)|^2 dt}$$

where $E[\bullet]$ denotes the expected value. The complementary cumulative distribution function (CCDF) is one of the most frequently used performance measures for PAPR reduction, representing the probability that the PAPR of an OFDM symbol exceeds a given threshold, $PAPR_0$, which is denoted as $CCDF=Pr(PAPR>PAPR_0)$. Other PAPR performance measures may be used, such as peak amplitude, crest factor, or PAPR normalized with respect to shaping gain. The reduction in PAPR results in a system that can either transmit more bits per second with the same hardware, or transmit the same bits per second with lower power and/or less-expensive hardware.

The optimization problem of finding precoded data vectors that yield the OFDM signals with the minimum PAPR can be regarded as a combinatorial optimization problem. A sub-optimal technique derives weights w that provide an acceptable reduction in PAPR while achieving a significant reduction in search complexity. Partial update can provide advantageous versions of this technique.

In SLM, one approach is to change every symbol in a candidate symbol sequence upon each iteration in order to minimize the covariance of average symbol powers of the candidate sequences. Zero covariance of a pair of candidate symbol sequences indicates that they are mutually independent. This broadly distributes U samples across the solution space. In some aspects of the disclosure, weight sequences provide for amplitude variations in addition to phase shifts, which can reduce the covariance of average symbol powers between candidate sequences more than phase shifts alone. These amplitude variations can permit fewer symbol changes between the candidate sequences while resulting in the same (or better) covariance values, which permits the use of sparse (e.g., partial-update) weight matrices instead of full (i.e., dense) weight matrices. This also permits the use of sparse invertible transform operations. When performing operations with sparse matrices, such as transforms and multiplication, it can be advantageous to store only the nonzero elements in order to save memory space and processing time. Sparse-operation optimizations have been developed that provide highly efficient memory access patterns, and the innovations disclosed herein enable such optimizations for SLM and other PAPR-reduction techniques.

In an iterative sampling of the solution space, PAPR measurements can guide subsequent selections of candidate symbol sequences. This is where partial update is particularly useful. In many iterative techniques, a subsequent sample is near a previous sample, so at least some covariance of average symbol powers between sequences is desired. This approach adaptively searches the solution space and can quickly converge to a global or local "best" solution. In this case, the samples in the solution space tend to cluster near global or local best solution. In iterative update, it can be useful for alternative symbol sequences to be at least somewhat correlated. This permits the next update to be determined based on the PAPR measurement of the previous update. For example, this can determine which weight value to update, and the magnitude and/or phase of the update that is likely to further reduce the PAPR. This can expedite convergence to an acceptable or best PAPR. In disclosed aspects, the weights $w_u$ need not be dependent on the data sequence X. Furthermore, the weights $w_u$ need not constrain the updated symbols to the symbol constellation of X.

In conventional SLM, additional candidate symbol sequences require full (dense) transforms and/or full (dense) matrix multiplications. The number of such dense operations increases with the number U of candidate sequences, whereas subsequent candidate sequences in a partial-update method can be provided with operations having lower computational complexity. Dense transforms can employ fast transform techniques, such as IFFT, and dense matrix multiplications can employ any of the generalized matrix multiplication (GEMM) techniques. Partial updates can replace the IFFT with a sparse IFFT algorithm. Since a sparse IFFT algorithm operates only on a subset of the input signal, it is not required to compute the values of all frequencies. By exploiting this property, only subsets of the frequencies are computed and hence the computational complexity of the IFFT is reduced drastically. Similarly, a wavelet-based approximate IFFT can exploit sparse inputs to operate more efficiently than the conventional IFFT. Partial updates can replace GEMM with a wide variety of sparse matrix multiplication techniques, including sparse matrix-vector multiplication (SpMV), sparse-matrix sparse-vector multiplication (SpMSpV), and matrix sparse-vector multiplication techniques which have been optimized for GPU and CPU architectures. In accordance with aspects of the disclosure the number of dense transforms or dense multiplications can be independent of constellation size and the number U of candidate signals.

In some aspects, a method performed by a client-side device, an intermediate device, or a server-side device reduces a PAPR of a discrete-time signal by selecting a signal with low PAPR from a set comprising a plurality of candidate discrete-time signals. The method may include generating a partial update discrete-time signal by performing a sparse invertible transform operation on a base data symbol sequence; and linearly combining a base discrete-time signal and the partial update discrete-time signal to produce an updated discrete-time signal. The updated discrete-time signal is included in the set of candidate discrete-time signals. The base discrete-time signal may be generated by performing a dense invertible transform operation on the base data symbol sequence or may be selected from a previous updated discrete-time signal. The sparse invertible transform operation may at least one of a sparse IFFT, a wavelet-based approximate IFFT, a sparse matrix-vector multiplication, a sparse-matrix sparse vector multiplication, or a matrix sparse-vector multiplication. At least one additional partial update discrete-time signal may be generated by at least one of linear combining a first partial update discrete-time signal with a second partial update discrete-time signal, or multiplying the partial update discrete-time signal with a complex-value scaling factor. The methods disclosed herein may be optimized to run on a GPU or CPU.

In one aspect, the sparse invertible transform operation may comprise performing a component-wise multiplication of the base symbol sequence with a sparse weight matrix to generate a sparse update symbol sequence, and performing an invertible transform operation on the sparse update symbol sequence. In another aspect, the sparse invertible transform operation may comprise employing the sparse weight matrix to select at least one block of elements in a dense invertible transform operator to produce a sparse invertible transform operator, and using the sparse invertible transform operator to operate on the base symbol sequence. In yet another aspect, the sparse invertible transform operation may comprise selecting at least one block of elements in the dense invertible transform operator to produce the sparse invertible transform operator, selecting at least one element in the base symbol sequence to produce the sparse update symbol sequence, and using the sparse invertible transform operator to operate on the sparse update symbol sequence.

In some aspects, an apparatus may include means for generating a partial update discrete-time signal by performing a sparse invertible transform operation on a base data symbol sequence; and means for linearly combining a base discrete-time signal and the partial update discrete-time signal to produce an updated discrete-time signal. The apparatus may further include means for generating at least one additional partial update discrete-time OFDM signal by at least one of linear combining a first partial update discrete-time OFDM signal with a second partial update discrete-time OFDM signal, or multiplying the partial update discrete-time OFDM signal with a complex-value scaling factor.

Aspects disclosed herein or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media). Aspects generally include a method, apparatus, system, computer program product, non-transitory computer-readable medium, user equipment, wireless communication device, and processing system as substantially described herein with reference to and as illustrated by the accompanying drawings.

BRIEF DESCRIPTION OF THE DRAWINGS

The features, nature, and advantages of the present disclosure will become more apparent from the detailed description set forth below when taken in conjunction with the drawings described below. Throughout the drawings and detailed description, like reference characters may be used to identify like elements appearing in one or more of the drawings.

FIG. 5A is a diagram illustrating an example weight selector in accordance with various aspects of the present disclosure.

FIGS. 5B and 5C are diagrams illustrating methods for reducing PAPR in accordance with various aspects of the present disclosure.

Figure 1A:
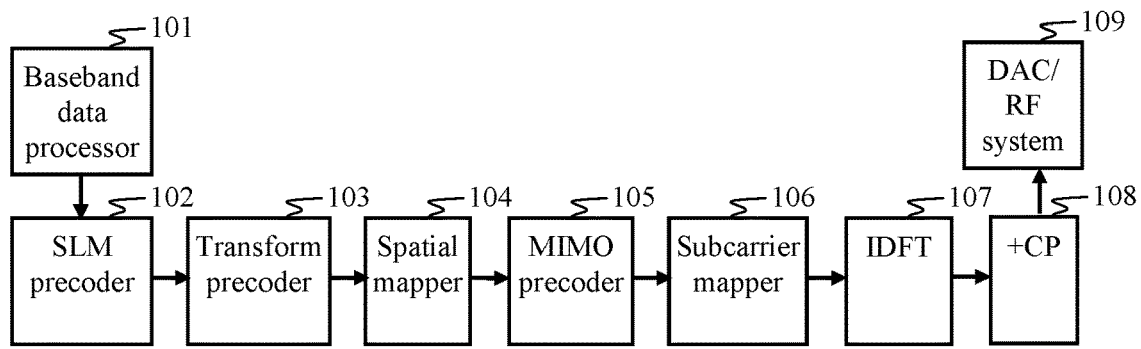
FIGS. 1A-1D are diagrams illustrating examples of transmitters in accordance with various aspects of the present disclosure.

It is contemplated that elements described in one aspect may be beneficially utilized on other aspects without specific recitation.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description. The detailed description and drawings are merely illustrative of the disclosure rather than limiting, the scope of the disclosure being defined by the appended claims and equivalents thereof.

FIG. 1A is a block diagram illustrating a schematic configuration of a transmitter for transmitting data to which SLM precoding is applied. The transmitter includes a baseband data processor 101, an SLM precoder 102, a transform precoder 103, a spatial mapper 104, a Multiple-Input, Multiple-Output (MIMO) precoder 105, a subcarrier mapper 106, Inverse DFT (IDFT) module 107, Cyclic Prefix (CP) appender 108, and Digital Analog Converter/Radio Frequency (DAC/RF) module 109.

The baseband data processor 101 couples original data symbols (e.g., comprising bit sequences that have been converted into modulation symbols) to the SLM precoder 102, which selects SLM weights that reduce the PAPR of the discrete-time OFDM transmission signal and applies those selected weights to the original data symbols. For example, the SLM precoder 102 may select a weight matrix from a set of candidate weight matrices, such that when applied to the original data symbols, results in a discrete-time OFDM signal having the least PAPR value, and then output a weighted data set comprising the selected weight matrix multiplied component-wise with the original data symbols. The SLM precoder 102 may compute the PAPR of each discrete-time OFDM signal corresponding to each candidate weight matrix, compare the PAPR to a threshold value, and then select a weight matrix that provides a PAPR below the threshold value. The SLM precoder 102 outputs a weighted data set comprising the selected weight matrix multiplied component-wise with the original data symbols.

The transform precoder 103 performs transform precoding on the weighted data set. The transform precoder 103 may be an SC-FDMA precoder comprising one or more DFT modules. In case of an M-point DFT, a block of M input samples are transformed to frequency-domain symbols. The spatial mapper 104 assigns at least one source of the original data symbols to a plurality of antennas. Mapping the data to the respective antennas (ports) is referred to as spatial mapping. Spatial mapper 104 may be called a layer mapper. The MIMO precoder 105 applies a spatial precoding matrix, such as spatial multiplexing weights computed from channel state information (CSI) or MIMO weights retrieved from a codebook. For example, the MIMO precoder 105 performs precoding on multiple layers output by spatial (or layer) mapper 104. The subcarrier mapper 106 maps the precoded data to the appropriate (e.g., scheduled) subcarriers. The subcarrier mapper 106 may be called a resource-element mapper. Subcarrier mapper 106 can comprise a plurality of subcarrier mapper modules, such as one subcarrier mapper module for each layer or antenna. The IDFT module 107 converts mapped frequency-domain symbols into discrete-time OFDM signals. The IDFT module 107 may comprise a separate IDFT for each layer or antenna. The IDFT module 107 may provide for an oversampled IDFT. The CP appender 108 adds a CP to each discrete-time OFDM signal. The DAC/RF module 109 converts the digital signal to analog and transmits the analog signals in the radio channel.

Figure 1B:
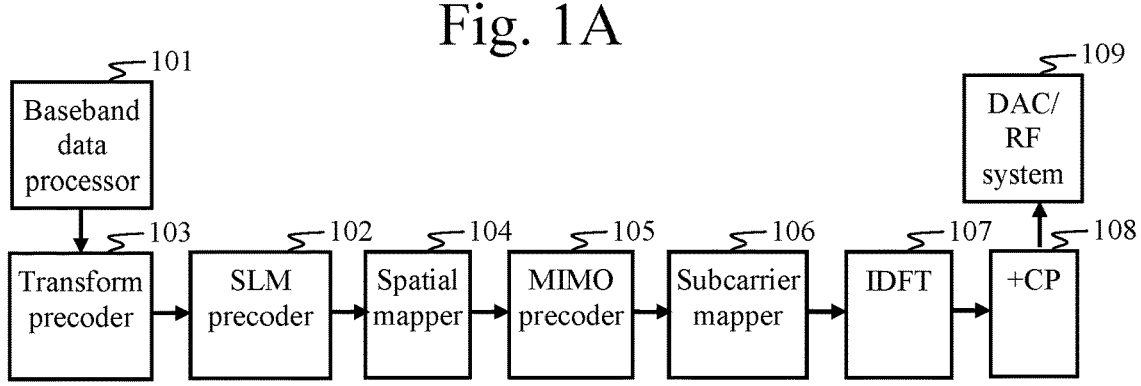
Figure 1C:
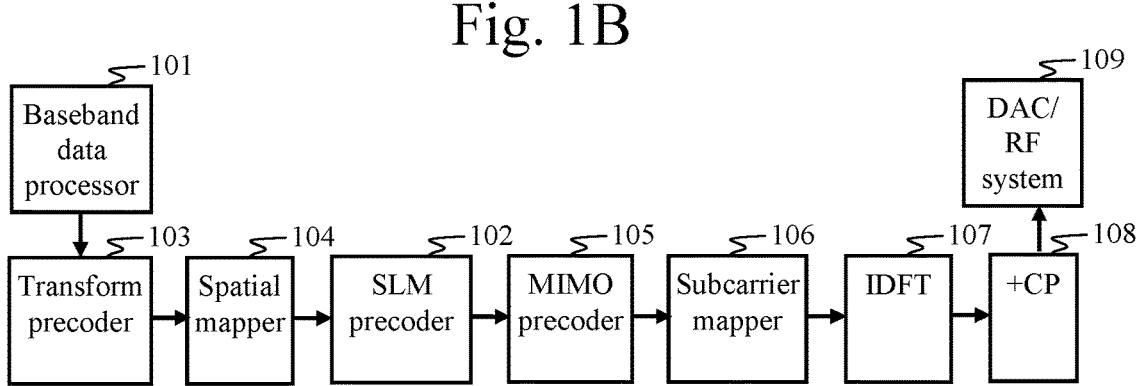
Figure 1D:
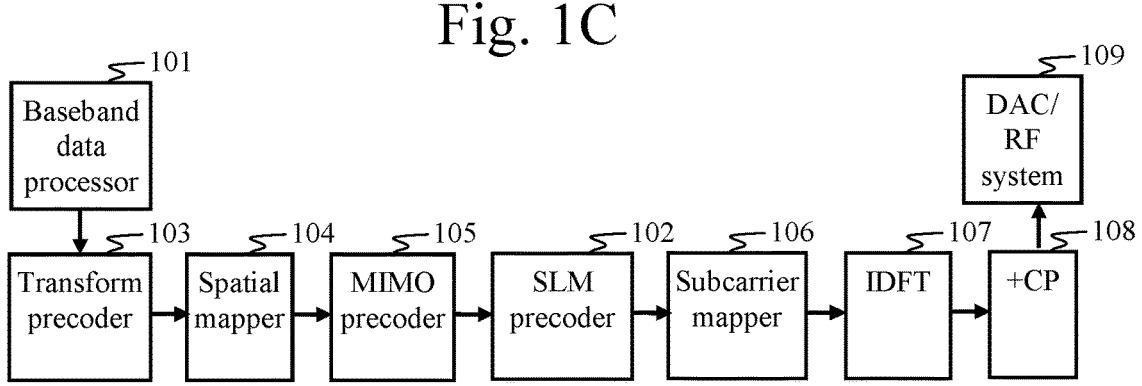

In FIG. 1B, the SLM precoder 102 follows the transform precoder 103, and thus selects and applies SLM weights to transform-precoded symbols. In FIG. 1C, the SLM precoder 102 follows the spatial mapper 104, and thus selects and applies SLM weights to spatial-mapped symbols. The SLM precoder 102 may comprise multiple SLM precoder modules, one SLM precoder module for each layer or antenna. In a distributed antenna system, an SLM precoder module may reside on each radio-access network node or each antenna of the distributed antenna system when the SLM precoder 102 is placed downstream from the spatial mapper 104. In FIG. 1D, the SLM precoder 102 follows the MIMO precoder 105, and thus selects and applies SLM weights to MIMO-precoded symbols.

In some transmitter configurations, more than one SLM precoder 102 can be provided, such as multiple SLM precoders positioned at different locations in the transmitter chain. In the transmitter configuration disclosed herein, some of the blocks depicted in the Figures can be optional. For example, the transform precoder 103 can be optional. The spatial mapper 104 and MIMO precoder 105 can be optional. In some aspects, a transmitter is provided without the transform precoder 103, spatial mapper 104, and MIMO precoder 105. It should also be appreciated that transmitter configurations can be provided in accordance with aspects of the invention that comprise transmitter blocks not explicitly depicted herein. A transmitter employed in the invention may comprise encoding, bit-shifting, spreading, scrambling, and/or interleaving blocks, and the SLM precoder 102 operations can be configured accordingly to perform its functions while accommodating such encoding, bit-shifting, spreading, scrambling, and/or interleaving. A transmitter may comprise one or more additional or alternative invertible transform operations, and the SLM precoder 102 can be adapted accordingly to perform its operations as disclosed herein.

Figure 2A:
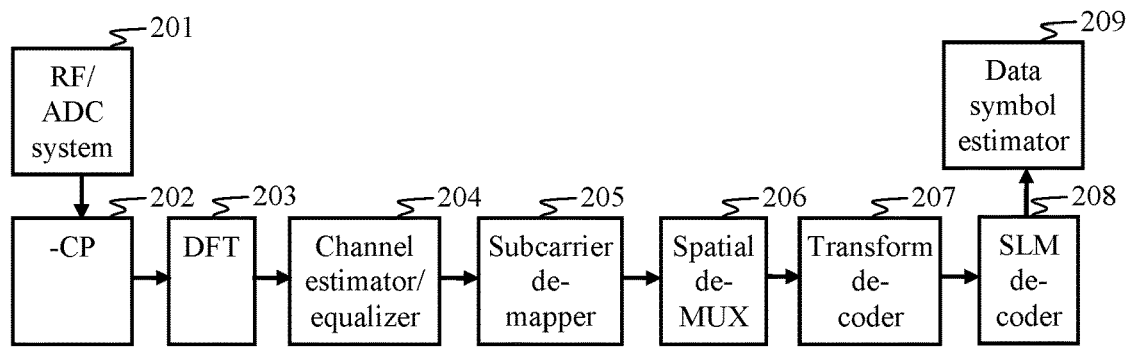
FIGS. 2A-2D are diagrams illustrating examples of receivers in accordance with various aspects of the present disclosure.

Referring to FIG. 2A, a receiver in which aspects of the invention can be implemented comprises an RF/ADC module 201, a CP remover 202, a DFT module 203, a channel estimator/equalizer 204, a subcarrier demapper 205, a spatial demultiplexer 206, a transform decoder 207, an SLM decoder 208, and a data symbol estimator 209.

The RF/ADC module 201 receives and converts received radio signals to digital baseband signals. The CP remover 202 removes the CP of each received discrete-time OFDM signal. The DFT module 203 transforms (e.g., demodulates) the discrete-time OFDM signal to frequency-domain symbols. The channel estimator/equalizer 204 estimates the propagation channel (e.g., derives CSI) and performs frequency-domain equalization. Subcarrier demapper 205 separates the frequency-domain data into subcarrier data (which may correspond to different scheduled transmission channels). The spatial de-multiplexer (de-MUX) 206 is optionally provided to perform any decoding on the data based on the precoding applied to the transmitted data. For example, a decoder in the spatial de-MUX 206 may employ a codebook index shared by the transmitter and receiver to select a decoding matrix. The spatial de-MUX 206 may perform spatial de-multiplexing to discriminate between per-antenna data. The transform decoder 207 performs transform decoding on the data. For example, if the transform precoder 103 comprises a DFT module, the transform decoder 207 comprises an IDFT module. The transform-decoded data symbols are processed by the SLM decoder 208, which removes SLM weights from the received data symbols.

The SLM decoder 208 may receive an index (possibly a codebook index) corresponding to the selected weight matrix employed by the SLM precoder 102 in the transmitter. For example, the index may be transmitted as side information in a control channel (e.g., a physical uplink control channel or a physical uplink shared channel), derived from a syndrome in the received signal, or otherwise conveyed to the receiver. The SLM decoder 208 may determine the selected weight matrix blindly. In some aspects, the SLM decoder 208 performs decoding using different possible codes or code segments until it identifies the selected weight matrix. The SLM precoder 102 and decoder 208 may employ orthogonal SLM codes. When the SLM decoder 208 identifies the selected weight matrix, it removes the weights (i.e., the SLM sequence) from the received data. The data symbol estimator 209 determines the original data symbol from the SLM-decoded data.

Figure 2B:
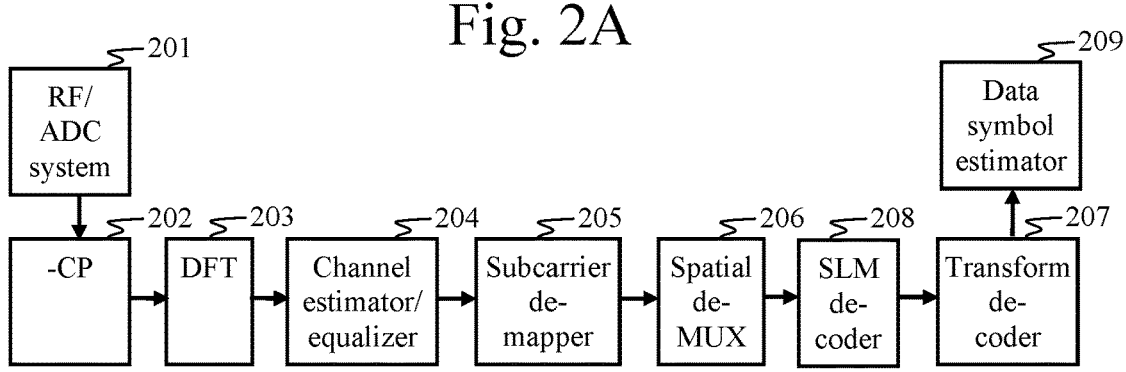
Figure 2C:
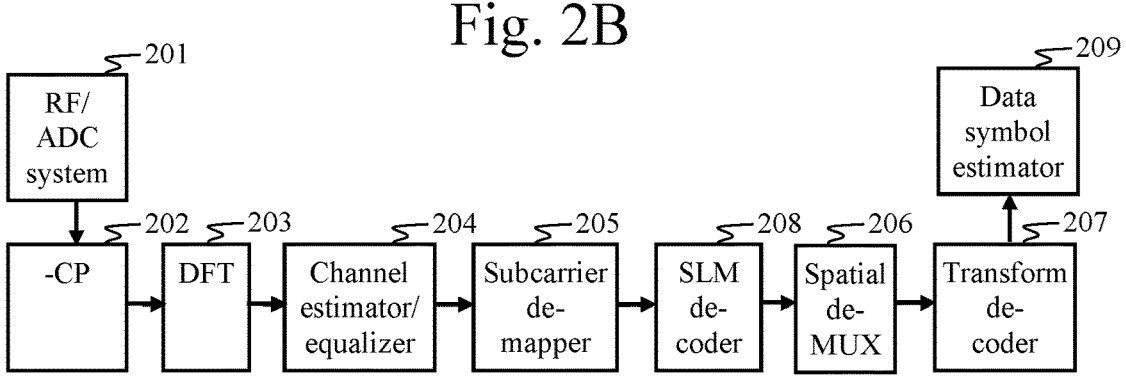
Figure 2D:
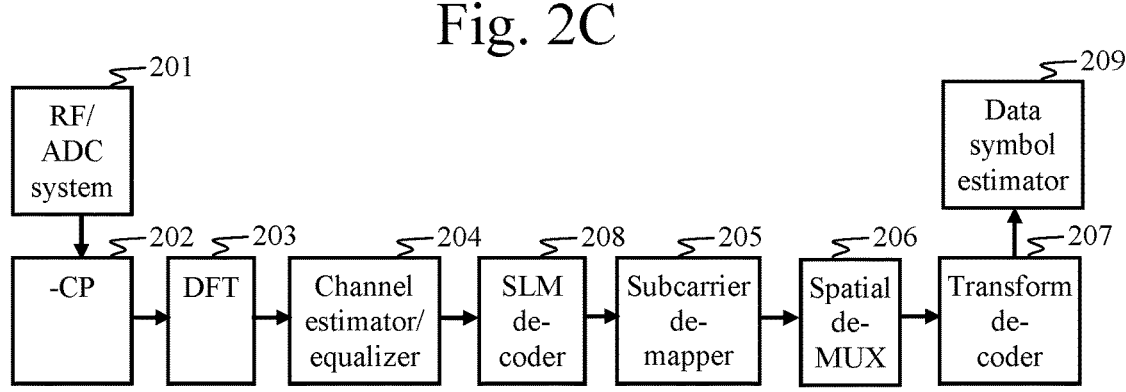

FIGS. 2B, 2C, and 2D depict receiver configurations wherein the SLM decoder 208 is positioned in different positions in the receiver chain. Such positioning corresponds to the order of operations in a corresponding transmitter. As described above with respect to optional blocks in the transmitter, corresponding blocks in the associated receiver configuration can be optional. For example, spatial de-MUX 206 may be optional. The transform decoder 207 may be optional. Some receiver configurations can comprise more than one SLM decoder 208, such as may provide for complementary SLM processing with respect to a transmitter with multiple SLM precoders.

Transmitters and receivers disclosed herein can comprise client-side, server-side, and/or intermediate (e.g., relay) devices. Client-side devices can include UEs, access terminals, user terminals, Internet-of-Things (IoT) devices, wireless local area network (WLAN) devices, wireless personal area network (WPAN) devices, unmanned aerial vehicles, and intelligent transportation system (ITS) nodes. Many client-side devices are battery powered and may have limited access to computational resources, and thus will benefit from improved power-efficiency and low computational complexity such as provided for uplink communications in the aspects disclosed herein. Client-side devices can be configured to perform Cooperative-MIMO in a distributed antenna configuration comprising other client-side devices, relays, and/or server-side devices. MIMO precoding can entail additional challenges for power efficiency and can increase computational overhead. Client-side devices that have cost, power, and/or computational processing restrictions will benefit from PAPR-reduction schemes with reduced computational processing.

Server-side devices can comprise base transceiver stations, which are also referred to as EnodeB's, small cells, femtocells, metro cells, remote radio heads, mobile base stations, cell towers, wireless access points, wireless routers, wireless hubs, network controllers, network managers, radio access network (RAN) nodes, HetNet nodes, wireless wide area network (WWAN) nodes, distributed antenna systems, massive-MIMO nodes, and cluster managers. In some aspects, server-side devices can comprise client devices and/or relays configured to operate in server-side mode. Dense deployments of server-side devices often entail power, computer-processing, and/or cost constraints. Such devices will benefit from PAPR-reduction schemes with reduced computational processing disclosed herein.

Intermediate devices can include fixed and/or mobile relays. Intermediate devices can comprise client devices and/or server-side devices, such as those disclosed herein. An intermediate device can include a remote radio head having a wireless backhaul and/or fronthaul. In ad-hoc, mesh, and other distributed network topologies, intermediate devices can provide for improving network coverage and performance. Intermediate devices include mobile ad hoc network (MANET) nodes, peer-to-peer nodes, gateway nodes, vehicular ad hoc network (VANET) nodes, smart phone ad hoc network (SPAN) nodes, Cloud-relay nodes, geographically distributed MANET nodes, flying ad hoc network (FANET) nodes, airborne relay nodes, etc. Intermediate devices may be battery-powered, solar-powered, or otherwise have limited available power. Similarly, intermediate devices may have cost constraints and/or limited computer processing capabilities. Such devices will benefit from PAPR-reduction schemes with reduced computational processing disclosed herein.

Figure 3:
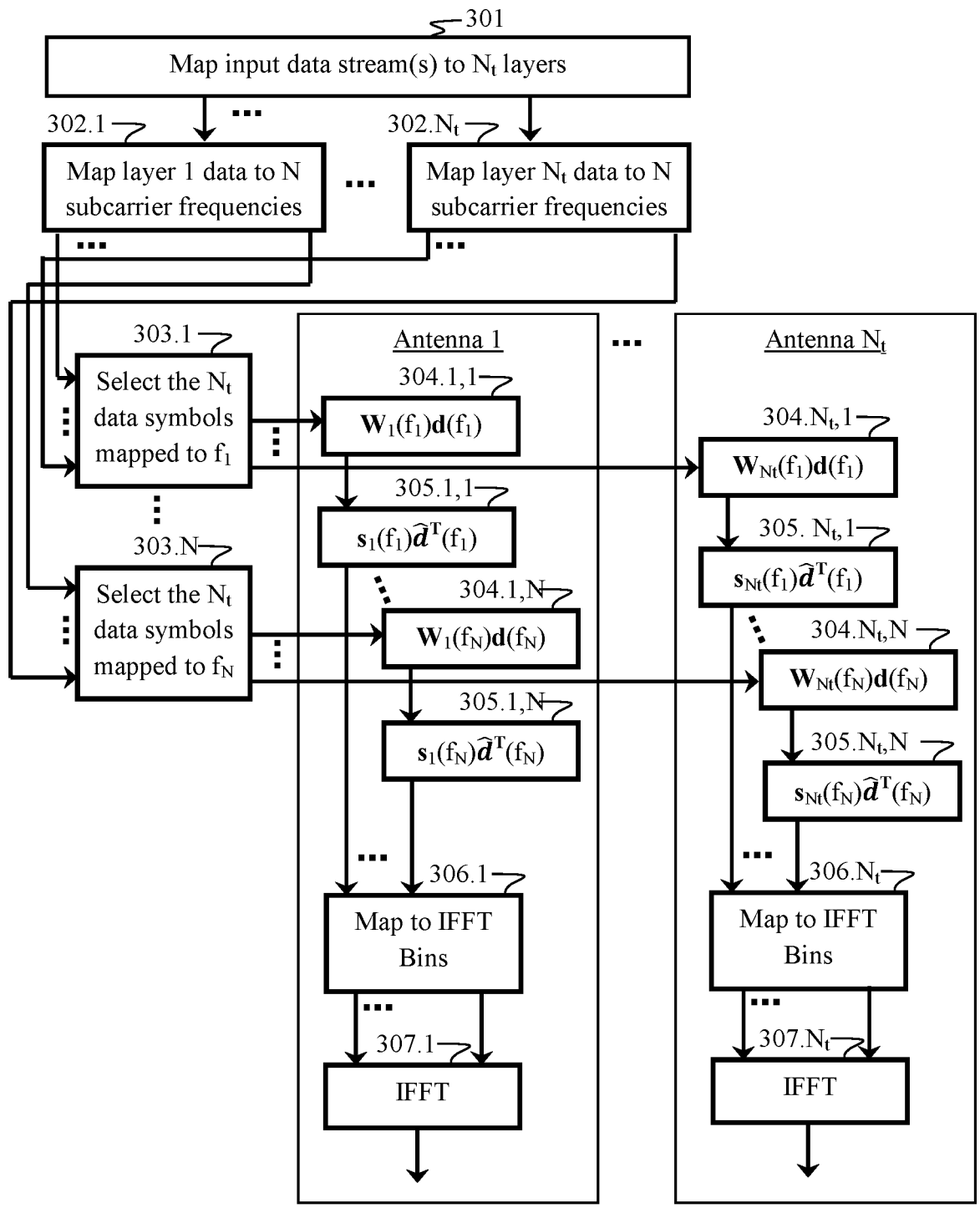
FIG. 3 is a diagram that depicts PAPR-reduction in a multi-antenna system in accordance with various aspects of the present disclosure.

FIG. 3 is a flow diagram that depicts PAPR-reduction operations in a multi-antenna system. Blocks depicted herein can represent operations performed in a centralized processor or may be distributed across multiple processors, such as in a Cloud computing configuration. The processors may reside on network nodes, such as nodes corresponding to the multiple antennas in a Cooperative-MIMO configuration and/or in servers in one or more remote data centers.

One or more input data streams are mapped 301 to a number $N_t$ of layers corresponding to multiple MIMO transmission channels, such as MIMO subspace channels. Data in each layer 1-$N_t$ is mapped 302.1-302.$N_t$ to a plurality N of OFDM subcarrier frequencies, such as in accordance with scheduling information that assigns N subcarriers to a transmitter. The mapping 302.1-302.$N_t$ can comprise partitioning the data symbols into $N_t$ blocks of size N. Data selection 303.1-303.N provides for selecting a set of $N_t$ data symbols corresponding to each frequency, $f_1$ to $f_N$. For each frequency $f_1$ to $f_N$, a corresponding data symbol is collected from each of the aforementioned $N_t$ blocks. Data symbols arranged in each process 303.1-303.N can be formatted into N blocks of size $N_t$.

A block of $N_t$ data symbols $d(f_1)$ corresponding to frequency $f_1$ is processed for each of the $N_t$ antennas (e.g., shown as Antenna 1-Antenna $N_t$). This is performed for each frequency up to $f_N$. For simplicity, it is assumed that the number of transmit antennas equals the number of layers. However, different antenna configurations can be employed, such as wherein the number of antennas is greater than $N_t$.

Processing for Antenna 1 can comprise applying a PAPR-reduction weight matrix (which may comprise a phase rotation sequence) to each of the data blocks $d(f_1)$-$d(f_N)$ 304.1,1-304.1,N-304.$N_t$,1-304.$N_t$,N. Weight matrices $W_1(f_1)$-$W_1(f_N)$ can be employed for Antenna 1, and $W_{Nt}(f_1)$-$W_{Nt}(f_N)$ can be employed for Antenna $N_t$. Each data block resulting from the product of a weight matrix $W_j(f_n)$ (indexed by antenna (j) and frequency (n)) with a data symbol block $d(f_n)$ 304.1,1-304.1,N-304.$N_t$,1-304.$N_t$,N is denoted as $\hat{d}(f_n)$.

Each data symbol block $d(f_n)$ corresponding to each antenna (1 to $N_t$) is multiplied by a MIMO precoding vector $s_i(f_n)$ indexed by antenna (j) and frequency (n) 305.1,1-305.1,N-305.$N_t$,1-305.$N_t$,N to produce a corresponding precoded symbol value. Thus, for each antenna, N precoded symbol values are produced that correspond to a set of N symbol blocks $d(f_n)$, n=1, . . . ,N, of size $N_t$. Each of the N precoded symbol values comprises a linear combination of the $N_t$ data symbols of the block $d(f_n)$ of the corresponding subcarrier frequency $f_n$. The N precoded symbol values for each antenna are mapped 306.1-306.$N_t$ to input bins of a set of IFFTs 307.1-307.$N_t$, which generate a discrete-time MIMO-OFDM signal for each of the antennas 1-$N_t$.

Figure 4:
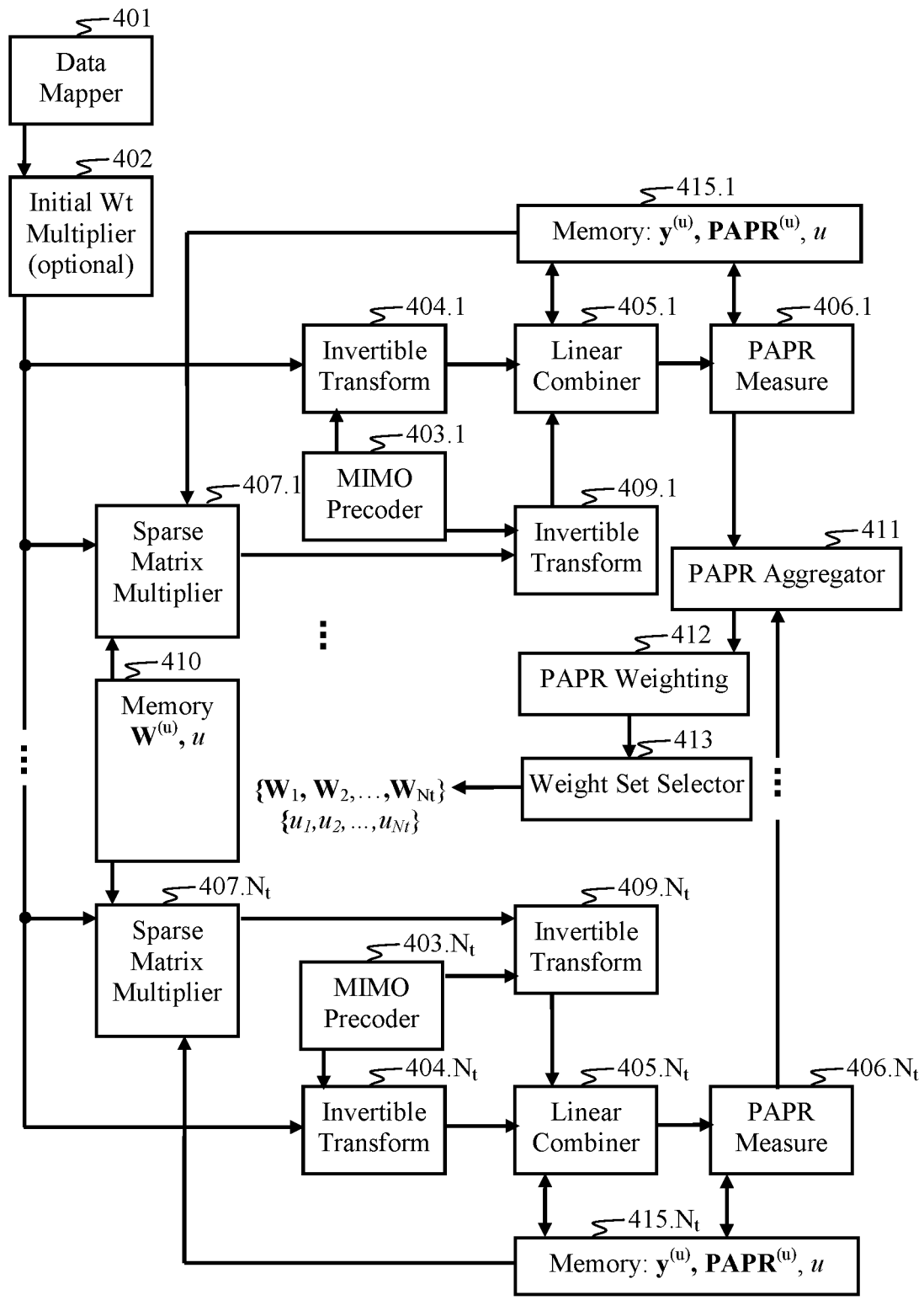
FIG. 4 is a diagram illustrating an example of weight selection for PAPR reduction in accordance with various aspects of the present disclosure.

Selection of the weight matrices $W_j(f_n)$ in FIG. 3 is explained with reference to the block diagram illustrated in FIG. 4. Aspects disclosed herein can be configured for centralized processing in a massive-MIMO antenna array, centralized processing in a distributed antenna system, and distributed processing in a distributed antenna system, for example. Distributed processors employed herein can comprise a Cloud computing network, such as may comprise selectable processors and memories distributed across machines in a rack, machines in multiple racks, and/or machines residing in multiple geographically distributed data centers. The Cloud computing network can include software-defined selectable and/or configurable network resources, including switches, routers, access points, gateways, and the like. Such selectable and/or configurable network resources can provide for selectable and configurable access to backhaul networks. Such selectable and configurable access can comprise selectable bandwidth, selectable latency, selectable quality of service, and the like. The Cloud computing network may comprise cooperating wireless devices functioning as antennas as well as distributed processors in a Cooperative-MIMO system. Each of the cooperating wireless devices may comprise processing resources (which can include Cloud storage and virtual networking resources) and may be configured to perform at least some of the PAPR-reduction operations disclosed herein.

A data mapper 401 can map one or more input data streams to resource blocks and layers. Optionally, data may be processed by a multiplier 402 configured to multiply the data with one or more weights, such as an initial weight set $W^{(0)}$. Multiplier 402 might be configured to scramble the data, spread the data with any type of spreading code and/or multiple access code, and/or perform any type of transform precoding (such as SC-FDMA precoding). Data symbols output by the mapper 401 or the multiplier 402 are input to a plurality $N_t$ of processing branches wherein each branch corresponds to one of the $N_t$ antennas. The processing branches can be implemented in a serial or parallel architecture of processors, or combinations thereof. The processing branches may employ a centralized processor, a distributed set of processors, or a combination thereof.

A first branch comprises a first path through an Invertible Transform 404.1 and generates an initial base discrete-time MIMO-OFDM signal, and a second path through a Sparse Matrix Multiplier 407.1 and an Invertible Transform 409.1 that generates one or more (U) partial-update discrete-time MIMO-OFDM signals. Linear Combiner 405.1 sums at least one partial-update discrete-time MIMO-OFDM signal with a base discrete-time MIMO-OFDM signal to produce an updated discrete-time MIMO-OFDM signal, which is analyzed in a PAPR measurement module 406.1 to measure the signal's PAPR. A MIMO Precoder 403.1 provides a set of MIMO precoding weights to the invertible transforms 404.1 and 409.1. A similar process is performed in each of the remaining $N_t$−1 (physical or logical) processing branches.

An $N_t^{th}$ branch comprises a first path through Invertible transform 404.$N_t$, which produces an initial base discrete-time MIMO-OFDM signal, and a second path through Sparse Matrix Multiplier 407.$N_t$ and Invertible Transform 409.$N_t$, which produces one or more (U) partial-update discrete-time MIMO-OFDM signals. Linear Combiner 405.$N_t$ sums at least one partial-update discrete-time MIMO-OFDM signal with a base discrete-time MIMO-OFDM signal to produce an updated discrete-time MIMO-OFDM signal, which is analyzed in a PAPR measurement module 406.1 to measure the signal's PAPR. A MIMO Precoder 403.$N_t$ provides a set of MIMO precoding weights to the invertible transforms 404.$N_t$ and 409.$N_t$.

With respect to each of the $N_t$ branches, a description of the first branch is provided herein for simplicity. Linear Combiner 405.1 might store and/or read a base discrete-time MIMO-OFDM signal $y^{(u)}$ from memory 415.1. In one aspect, the initial base discrete-time MIMO-OFDM signal is the only base discrete-time MIMO-OFDM signal employed in the Linear Combiner 405.1. In other aspects, an updated discrete-time MIMO-OFDM signal may be designated as a base discrete-time MIMO-OFDM signal. PAPR measurement module 406.1 may store and/or read PAPR (e.g., $PAPR^{(u)}$) and/or update index u to memory 415.1. Index u can be a codebook index corresponding to a weight matrix $w^{(u)}$ in a weight codebook. PAPR measurement module 406.1 may store an updated discrete-time MIMO-OFDM signal to the memory, its PAPR, and the corresponding update index, such as in response to comparing its PAPR to a previous PAPR measurement or some threshold value. PAPR measurement module 406.1 might designate an updated discrete-time MIMO-OFDM signal having a low PAPR as a base discrete-time MIMO-OFDM signal, and may delete any previously written data from the Memory 415.1. Based on PAPR measurements (such as PAPR$^{(u)}$ and possibly index u read from Memory 415.1), the Sparse Matrix Multiplier 407.1 might select a weight matrix W$^{(u)}$ from Memory 410.

Stored values, such as u and its corresponding PAPR$^{(u)}$, can be read from the memory 415.1 by the module 406.1 and communicated to a PAPR aggregator 411 configured to collect PAPR and weight index values (and possibly other data) from the N$_t$ branches. Each branch's module 406.1-406.N$_t$ might communicate data corresponding to all U PAPRs to the aggregator 411, a number of PAPRs below a predetermined threshold, or a predetermined number of lowest PAPRs.

A PAPR weighting module 412 may optionally be provided for scaling each PAPR with a weight value corresponding to the branch from which it was received. For example, for a PAPR-sensitive branch, the weight might be 1, and for a branch having low PAPR-sensitivity, the PAPR might be zero. The weighted PAPR values are then processed in a weight selector 413, which can select a best weight set for use by all the branches. For example, for each index u, weight selector 413 can sum the corresponding weighted PAPR values from all the branches to generate an aggregate weighted-PAPR metric. The best weight set index (0≤u≤U) can be selected from the corresponding aggregate weighted-PAPR metric with the smallest value. The weight set selector 413 then communicates the best weight set index u (or the corresponding weights W$^{(u)}$ to the processing branches shown in FIG. 3 to be implemented in weighting processes 304.1,1-304.1,N-304.N$_t$,1-304.N$_t$,N.

In aspects in which PAPR weighting 412 is employed, each branch weight comprises a measure of the branch antenna's (or corresponding network node's) sensitivity to PAPR. For example, a normalized branch weight near one can correspond to a high PAPR sensitivity, whereas a normalized branch weight near zero can correspond to a low PAPR sensitivity. A battery-powered node can have a higher branch weight than a node with line power, since power efficiency is likely more critical to the operation of a battery-powered device. It is advantageous to schedule one or more line-powered nodes to operate in a cluster with a set of battery-powered nodes in a distributed antenna system, since the low branch weights of line-powered nodes can provide for additional degrees of freedom, which affords lower PAPR for battery-powered nodes. This enables weight selection 413 to provide lower PAPR for PAPR-sensitive nodes by allowing for high PAPR for nodes that are not as PAPR-sensitive.

In some aspects, PAPR weighting module 412 might compute one or more of the branch weights based on each corresponding node's battery life (which can comprise battery wear, battery charge level, percentage of fully charged, remaining device run time, battery status (e.g., charging or discharging), and combinations thereof) reported to the module 412. Devices with low battery life can be provided with higher corresponding branch weights than devices with nearly high battery life. Each branch weight might correspond to the inverse of the branch's battery charge level. The PAPR weighting module 412 might compute the branch weights based on a power-scaling factor assigned to each device (e.g., devices transmitting with higher power might have higher corresponding branch weights), a session duration assigned to each device (e.g., devices that are scheduled or otherwise expected to have a longer session, such as based on their type of data service or the file size they are transmitting, might have higher corresponding branch weights), a priority level (such as based on emergency or non-emergency links), a subscription level, or some other metric(s), or combination thereof. It is advantageous to schedule one or more nodes with low PAPR sensitivity to operate in a cluster with a set of nodes with high PAPR sensitivity in a distributed antenna system, since the low branch weights of low-PAPR-sensitive nodes can provide for additional degrees of freedom, which enables lower PAPR for the nodes with high PAPR sensitivity.

FIG. 5A is a block diagram illustrating a schematic configuration of an SLM weight selector, comprising a first Invertible Transform 504, a Sparse Matrix Multiplier 507, a second Invertible Transform 509 and a Linear Combiner 505. The weight selector can further comprise an input/output (I/O) processor 501, CSI Estimator 510, Memory 502, MIMO Precoder 508, and PAPR Measurement Module 506.

The first Invertible Transform 504 operates on a data symbol vector X to produce an initial base discrete-time OFDM signal: x=$\mathcal{F}$X, where $\mathcal{F}$ is an invertible transform operator. The operator $\mathcal{F}$ can comprise an inverse DFT matrix F$^H$, which may be implemented via a fast transform. The computational complexity of a complex N-point IFFT with oversampling factor K comprises (KN/2)log$_2$(KN) complex multiplications and KN log$_2$(KN) complex additions. The operator $\mathcal{F}$ can comprise one or more additional matrix operators, which usually increases the computational complexity. For example, MIMO Precoder 508 can provide a set of MIMO precoding weights to the Invertible Transform 504. The Invertible Transform 504 can generate a precoding matrix S from the precoding weights and multiply the data symbol vector X, and the product SX can be transformed by F$^H$: x=F$^H$(SX).

Sparse Matrix Multiplier 507 can employ a set of length-N sparse weight vectors w to multiply the symbol vector X=[X$_0$ X$_1$ ... X$_{N-1}$]T before processing by the second Invertible Transform 509. In some aspects, N×N diagonal weight matrices W may be employed. A sparse diagonal matrix W comprises one or more diagonal elements having zero value. In one aspect, a first weight matrix corresponding to a first symbol position can be w$^{(1,0,\cdots,0)}$=[1, 0, ..., 0], a second weight matrix corresponding to a second symbol position can be w$^{(0,1,\cdots,0)}$=[0, 1, ..., 0], ..., and an N$^{th}$ weight matrix corresponding to an N$^{th}$ symbol position can be w$^{(0,0,\cdots,1)}$=[0, 0, ..., 1].

A set of sparse partial-update symbol matrices (e.g., sequences) w$^{(\cdots)}$X can be computed (e.g., w$^{(\cdots)}$X is computed as w$^{(\cdots)}$⊗X, where "⊗" denotes element-wise multiplication). Each partial-update symbol matrix is the result of a Hadamard product (also known as the Schur product, entry-wise product, or component-wise product), which takes two matrices (w$^{(\cdots)}$ and X) of the same dimension and produces another matrix (w$^{(\cdots)}$X) where each element i,j is the product of elements i,j of the original two matrices: (w$^{(\cdots)}$X)$_{i,j}$=(w$^{(\cdots)}$)$_{i,j}$(X)$_{i,j}$. It should be appreciated that variations and alternatives of this disclosure can exploit the associative, distributive, and/or commutative properties of the Hadamard product.

In some aspects, a multiplication may be performed via addition or subtraction to arrive at the equivalent result.

Various corresponding bit-level operations may be employed to effect multiplication in the aspects disclosed herein. Multiplication can be performed by mapping constellation points of an input symbol sequence to another set of constellation points according to a weight sequence.

The second Invertible Transform 509 operates upon each sparse matrix $w^{(\cdots)}X$ (which is a partial update to data vector X) with operator $\mathcal{F}$ to produce a corresponding partial-update discrete-time OFDM signal x). In one aspect, Invertible Transform 509 generates precoding matrix S from precoding weights received from the MIMO Precoder 508 and then computes operator $\mathcal{F} = (F^H S)$. The operator $\mathcal{F}$ may be stored in memory and used to operate on each sparse matrix $w^{(\cdots)}X$. This results in the operation: $x^{(\cdots)} = (F^H S)(w^{(\cdots)}X)$. In another aspect, an operator $\mathcal{F} = F^H S w^{(\cdots)}$ is generated for each sparse weight matrix $w^{(\cdots)}$ and may be stored in memory. The Invertible Transform 509 can select stored operators from memory to operate on the data vector X, such as to perform the operation, $x^{(\cdots)} = (F^H S w^{(\cdots)})X$. This operator is a sparse matrix, so sparse-matrix vector (spMV) may be exploited. In one aspect, $F^H S$ is computed and stored, and for each $w^{(\cdots)}$, a corresponding column of $F^H S$ is read, followed by multiplication with X.

The operators disclosed herein can be multiplied by scaling factors and may be used to generate scaled partial-update discrete-time OFDM signals $x^{(\cdots)}$. The linearity property of invertible transforms can be exploited in combination with scaling factors to reduce the number of invertible transform computations. The Invertible Transform 509 may store partial-update discrete-time OFDM signals $x^{(\cdots)}$ in memory and supply scaled versions of such signals to the linear combiner 505.

The sparseness of $w^{(\cdots)}$ provides for simplification of the $\mathcal{F}$ operations by reducing the required number of complex multiplications and additions, resulting in a partial invertible transform operation. For example, the zero values in $w^{(\cdots)}X$ allow for reducing the number of complex multiplications and additions in operator $\mathcal{F} = (F^H S)$ acting upon $w^{(\cdots)}X$ compared to the full transform operation required to produce the initial base discrete-time OFDM signal. An updated discrete-time OFDM signal is produced by summing a partial-update discrete-time OFDM signal with the base discrete-time OFDM signal. This sum may comprise another KN (or fewer) complex additions. Similarly, the operator $\mathcal{F} = (F^H S w^{(\cdots)})$ has reduced complexity due to zero values in $w(\ldots)$, and is referred to herein as a partial invertible transform operation. This approach can be adapted for other linear transform operations. For example, the operator $\mathcal{F} = TF^H S$ and its variants can be simplified by virtue of the sparseness of $w^{(\cdots)}$, where T and S each represents any number of invertible transform operators. T and S can comprise one or more operators, such as spreading, pre-coding, permutation, block coding, space-time coding, and/or constellation mapping operators. $F^H$ may comprise any invertible transform operator, such as a wavelet transform, a fractional Fourier transform, etc.

It should be appreciated that the first and second Invertible Transforms 504 and 509 can comprise common structure. An Invertible Transform circuit, processor, and/or code segment can operate as the first Invertible Transform 504 employing a full invertible transform operation to produce the initial base discrete-time OFDM signal and operate as the second Invertible Transforms 509 employing partial invertible transform operations to produce partial-update discrete-time OFDM signals, the partial invertible transform operations each comprising fewer multiplications and additions than the full invertible transform operation.

The partial-update discrete-time OFDM signals $x^{(\cdots)}$ produced by the Invertible Transform 509, along with scaling factors a, can be stored in memory 502 for subsequent processing. Invertible Transform 509 and/or Linear Combiner 505 may generate new partial-update discrete-time OFDM signals $x^{(\cdots)}$ by scaling and/or combining previously generated partial-update discrete-time OFDM signals $x^{(\cdots)}$. Pre-computed partial discrete-time OFDM signals $x^{(\cdots)}$, each corresponding to a different one of the N symbol positions in X, can be selected and multiplied by scaling factor(s) a to produce new partial-update discrete-time OFDM signals $x^{(\cdots)}$. Aspects disclosed herein can exploit the linearity of invertible transforms to provide low-complexity partial updates to OFDM signals (which include spread-OFDM signals and MIMO-precoded OFDM signals).

$$ax_1^{(\cdots)}(t) + bx_2^{(\cdots)}(t) \overset{\mathcal{F}}{\leftrightarrow} aX_1(\omega) + bX_2(\omega)$$

where a and b are scalar values, $x_1^{(\cdots)}(t)$ and $x_2^{(\cdots)}(t)$ are length-KN partial-update discrete-time OFDM signals, and $X_1(\omega)$ and $X_2(\omega)$ are length-N sparse partial-update symbol matrices (e.g., $X_1(\omega) = w_1^{(\cdots)} \otimes X$ and $X_2(\omega) = w_2^{(\cdots)} \otimes X$, where $w_1^{(\cdots)}$ and $w_2^{(\cdots)}$ are length-N sparse weight vectors with non-zero values corresponding to the same or different symbol positions in X).

For sparse weight vectors $w^{(\cdots)}$ having a predetermined or adaptable symbol constellation of weight values, the scaling factors a and b can be selected according to the symbol constellation and employed as described above to produce corresponding partial-update discrete-time OFDM signals. For example, if $x^{(1,0,\cdots,0)}$ is generated by an partial invertible transform corresponding to the sparse weight vector $w^{(1,0,\cdots,0)}$, then $x^{(a,0,\cdots,0)}$ corresponding to $w^{(a,0,\cdots,0)}$ is produced from the product $x^{(a,0,\cdots,0)} = ax^{(1,0,\cdots,0)}$. Instead of performing an additional transform operation, $x^{(a,0,\cdots,0)}$ is produced by performing KN or fewer complex multiplications. New partial-update discrete-time OFDM signals can be generated from sums of partial-update discrete-time OFDM signals. For example, implementation of the scaling factor of (a+b) can be achieved by the following summation of previously computed signals $x^{(a,0,\cdots,0)}$ and $x^{(b,0,\cdots,0)}$: $x^{(a+b,0,\cdots,0)} = x^{(a,0,\cdots,0)} + x^{(b,0,\cdots,0)}$, which can comprise KN or fewer complex additions instead of a transform operation.

The Linear Combiner 505 is configured to sum each partial-update discrete-time OFDM signal with a base discrete-time OFDM signal to produce an updated discrete-time OFDM signal. The following addition is performed:

$$y^{(u)} = y^{(0)} + x^{(u)}$$

where $x^{(u)}$ is a $u^{th}$ partial-update discrete-time OFDM signal, $y^{(0)}$ is a base discrete-time OFDM signal, and $y^{(u)}$ is an updated discrete-time OFDM signal corresponding to index u. Linear Combiner 505 may store values $y^{(u)}$, $y^{(0)}$, and $x^{(u)}$ in memory 502, and may read values $y^{(0)}$ and $x^{(u)}$ from memory 502. Linear Combiner 505 may generate new $x^{(u)}$ values as described herein.

In one aspect, an initial (u=0) iteration includes writing the initial base discrete-time MIMO-OFDM signal (denoted by $y^{(0)}$) to the memory. Linear Combiner 505 can read $y^{(0)}$ from memory 502 and combine it with an $x^{(u)}$ generated by Invertible Transform 509. Linear Combiner 505 might store the resulting sum $y^{(u)}$ in the memory 502 for subsequent use by the Linear Combiner 505 and/or PAPR Measurement Module 506.

PAPR Measurement Module 506 computes the PAPR of $y^{(u)}$ and compares it to a previous PAPR and/or at least one PAPR threshold value. Based on the comparison, the signal $y^{(u)}$ and/or $y^{(0)}$ can be selected for further processing herein or may be selected as the signal to be transmitted. For example, the Linear Combiner 505 or Invertible Transform 509 can generate new $x^{(u)}$ values (such as by scaling and/or linear combining of previously generated $x^{(u)}$ values) based on the PAPR, and the Linear Combiner 505 combines the new $x^{(u)}$ with $y^{(u)}$ or a previous $y^{(u)}$. In some aspects, the PAPR Measurement Module 506 designates $y^{(u)}$ as the value $y^{(u)}$ to be updated in subsequent iterations, or PAPR Measurement Module 506 might select a previous value $y^{(u)}$. PAPR Measurement Module 506 can instruct Linear Combiner 505 to read values (e.g., $x^{(u)}, y^{(u)}, y^{(0)}$) from memory for subsequent processing. PAPR Measurement Module 506 might instruct Sparse Matrix Multiplier 507 to read values (e.g., $W^{(u)}$, a) to generate new weights.

PAPR Measurement Module 506 can comprise a peak detector, which is sometimes called a peak-hold circuit or a full-wave rectifier. The peak detector monitors a voltage and retains its peak value. A peak detector circuit tracks or follows an input voltage until the extreme point is reached and holds that value as the input decreases. This may be performed in a digital circuit or a processor programmed to determine a maximum value from a data set corresponding to the discrete-time signal under test. The peak detector may identify a signal having minimum peak power among U discrete signals by finding the signal having the smallest maximum value among the LN samples. PAPR Measurement Module 506 may perform algorithmic operations on digital data to determine PAPR. A cumulative distribution function (CDF) or a complementary cumulative distribution function (CCDF) can be used as a performance measure for PAPR. CCDF represents the probability that the PAPR of an OFDM symbol exceeds a given threshold, $PAPR_0$, and is denoted as $CCDF=Pr(PAPR>PAPR_0)$. PAPR can comprise peak, CDF, CCDF, and/or crest factor (which is the ratio of peak value to RMS value of a waveform). Other PAPR performance measures may be used.

The I/O 501 can comprise a processor configured for writing data received from components and/or other nodes to the memory 502 and reading the data from the memory 502 to be transmitted to components and/or other nodes. I/O circuitry 501 can comprise one or more wireless (e.g., radio, optical, or some other wireless technology) and/or wired (e.g., cable, fiber, or some other wire-line technology) transceivers. The I/O 501 can communicate PAPR to a PAPR Aggregator component (in the node or external to the node), which is then processed for weight selection. The I/O 501 can receive selected weights (or corresponding indices) from a weight set selector, and store the data in the memory 502 for use by the OFDM transmitter. For example, the Sparse Matrix Multiplier 507 can read the selected weights from the memory 502. The I/O 501 can communicate baseband OFDM signals (e.g., $y^{(u)}$) and/or other data (including side information, such as index u) to radio transceiver circuitry for processing and transmission.

CSI estimator 510 can measure received pilot signals and estimate CSI therefrom. The CSI may be stored in the memory 502 for use by the MIMO Precoder 508 and/or MIMO precoders in other nodes, which can select or generate Precoding weights therefrom. CSI may be used by PAPR Weighting module 412 to generate PAPR scaling weights.

FIG. 5B is a flow diagram indicating processing steps and/or program elements for performing partial updates to an OFDM signal and selecting a candidate signal with a best PAPR therefrom. A set of sparse operators ($F^H Sw^{(\cdots)}$ is computed 511, each corresponding to a set of sparse weight matrices $w^{(\cdots)}$. For example, individual operators $F^H$ and S can be computed together as a single dense operator FHS and stored in memory. The dense operator FHS is employed as a basis for sparse operators corresponding to each sparse weight matrix w). A particular operator $F^H Sw^{(\cdots)}$ is employed by selecting the non-zero block(s) in FHS corresponding to the non-zero blocks in $F^H Sw^{(\cdots)}$. For example, if a weight matrix $w^{(\cdots)}$ is a column vector that comprises a single non-zero row element (e.g., row index n), there is a single column in $F^H Sw^{(\cdots)}$ (e.g., column n) with non-zero elements corresponding to the single non-zero row element in $w^{(\cdots)}$. Thus, row index n and (optionally) a corresponding scaling factor an can be stored in memory to represent the sparse weight matrix $w^{(\cdots)}$, and when the corresponding sparse operator $F^H Sw^{(\cdots)}$ is retrieved, such as to perform the invertible transform operation $x^{(\cdots)}=(F^H Sw^{(\cdots)})X$, only the block (e.g., column n) in $F^H S$ corresponding to row index n is retrieved and used to generate a partial-update discrete-time OFDM signal 512. As long as S does not need to be updated, sparse operators corresponding to $F^H S$ can be reused for subsequent blocks of data symbols X to generate partial-update discrete-time OFDM signals 512 therefrom.

For a first block of data symbols X, partial-update discrete-time OFDM signals generated in 512 can be stored to memory. Step 512 can further comprise generating additional partial-update discrete-time OFDM signals by scaling and/or linear combining previously generated partial-update discrete-time OFDM signals. When large symbol constellations are used for SLM weights, step 512 can scale partial update discrete-time OFDM signals to produce new partial update discrete-time OFDM signals so no additional operations of $F^H S$ are required. The symmetry of such constellations can be exploited to reduce the number of operations. Step 512 can combine partial update discrete-time OFDM signals to generate new partial update discrete-time OFDM signals without requiring additional operations of $F^H S$. Thus, the number of $F^H S$ operations can be independent of constellation size and the number U of candidate signals.

Linear combining 513 comprises summing at least one partial-update discrete-time OFDM signal with a base discrete-time OFDM signal to produce a new updated (or candidate) discrete-time OFDM signal. The base discrete-time OFDM signal may be an initial base discrete-time OFDM signal or a previous updated discrete-time OFDM signal. The candidate discrete-time OFDM signals (including the base) and an index u corresponding to each candidate discrete-time OFDM signal may be stored in memory.

A PAPR 514 is computed for each candidate discrete-time OFDM signal and possibly stored such that it is indexed by u. A decision process 515 comprises comparing the PAPR to a threshold and/or at least one previous PAPR, and possibly storing the current PAPR in memory indexed by u. The decision 515 can direct whether to perform subsequent iterations. The decision 515 may comprise denoting the current candidate discrete-time OFDM signal as the base discrete-time OFDM signal to be used in a subsequent iteration. The decision 515 may select for output the discrete-time OFDM signal and/or associated data (e.g., weights, index, etc.) corresponding the best PAPR or PAPR below the threshold.

If a subsequent iteration is performed, subsequent partial updates to the base signal are selected or adapted 516. Select/Adapt 516 can control the function of Generate 512 and/or Linear combine 513. For example, based on the current PAPR (and previous PAPRs), Select/Adapt 516 can select the partial update to be summed with the base signal, and optionally which base signal to use. Select/Adapt 516 can select n and/or an corresponding to the update. Such data-dependent updating can provide faster convergence in some cases (e.g., for stationary signals) than algorithms that use data-independent updating schedules. A step size for updating the scaling factor an can be selected to improve convergence and/or stability. A new scaled partial-update discrete-time OFDM signal can be produced by scaling a previous discrete-time OFDM signal and/or combining discrete-time OFDM signals. The step size may be constant or may be variable based on one or more measurement criteria. Conditions on the step size can be derived to provide convergence in the mean and the mean square sense. Step sizes and other parameters can be stored in the memory.

FIG. 5C is a flow diagram of a method and/or computer program for performing partial updates to an OFDM signal and selecting a candidate signal with a best PAPR. A dense operator ($F^H S$) is computed 521 and stored in memory. The dense operator can operate on a dense data matrix X to produce an initial base discrete-time OFDM signal. The dense operator operates 522 on a sparse data matrix to produce a partial-update discrete-time OFDM signal. The sparse data matrix may be produced by setting selected values in the dense data matrix to zero, such as with respect to zero values in sparse weight matrix $w^{(\cdots)}$. The dense data matrix X may be stored in memory, and the sparse data matrix ($w^{(\cdots)}X$) can be provided by selecting only non-zero elements of X corresponding to non-zero elements in $w^{(\cdots)}$. The sparse weight matrix $w^{(\cdots)}$ may be stored in memory as an index n corresponding to each non-zero matrix element (e.g., a row index in a column vector) and optionally a complex value an corresponding to the $n^{th}$ value. The sparse data matrix may be provided by selecting from the stored X the element $X_n$ corresponding to each n, and scaling $X_n$ or its corresponding partial-update discrete-time OFDM signal with an.

As in FIG. 5B, the partial-update discrete-time OFDM signal is combined 523 with a base discrete-time OFDM signal, the PAPR of the updated (candidate) discrete-time OFDM signal is computed 524, and a decision process is performed 525. The decision 525 can comprise updating the base discrete-time OFDM signal, such as by designating a current or previous candidate signal as the base signal. Select/Adapt 526 can operate similarly as Select/Adapt 516. In some aspects, Select/Adapt 526 can provide for new sparse data matrices to be operated on in step 522.

Figure 6:
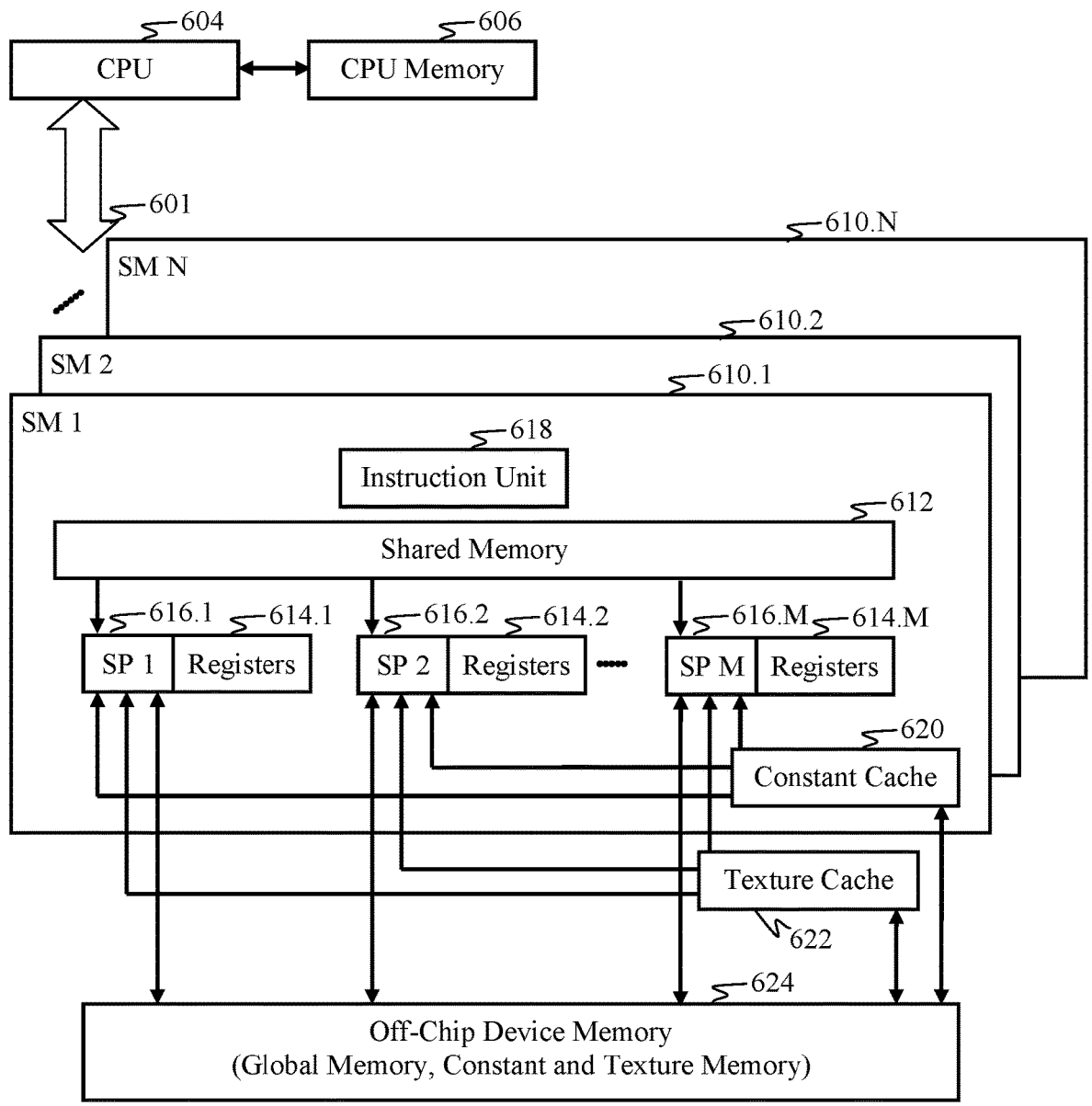
FIG. 6 is a diagram illustrating a GPU architecture that can be optimized for signal-processing functions in accordance with various aspects of the present disclosure.

FIG. 6 is a diagram illustrating a graphics processing unit (GPU) architecture that can be optimized for signal-processing functions disclosed herein. The hardware and/or software can optimize sparse processing operations enabled by the partial-update methods for PAPR reduction of discrete-time OFDM signals. These partial-update methods enable a variety of optimization solutions specific to sparse processing. The GPU architecture can be adapted for optimizing global memory access, optimizing shared memory access, and exploiting reuse and parallelism. Optimizing the sparse processing operations can include characterizing memory access cost, access pattern, type and level of memory, and exploiting data locality. Exploiting reuse can include caching each element in on-chip memories, and exploiting parallelism can include employing synchronization-free parallelism.

Aspects disclosed herein can provide for optimizing sparse operations (such as sparse matrix-vector multiplication) on graphics processing units (GPUs) using model-driven compile- and run-time strategies. By way of illustration, FIG. 6 depicts a GPU parallel computing architecture includes N levels of streaming multiprocessors (SMs) 610.1-610.N (SM 1, SM 2, . . . , SM N), each comprising a shared memory component 612, a level of registers 614.1-614.M, a level of streaming processors (SPs) 616.1-616.M (SP 1, SP 2, . . . , SP M), an instruction unit 618, a constant cache component 620, and a texture cache component 622. There are various memories available in GPUs, which can be organized in a hybrid cache and local-store hierarchy. The memories can include off-chip global memory, off-chip local memory, on-chip shared memory, off-chip constant memory with on-chip cache, off-chip texture memory with on-chip cache, and on-chip registers. An off-chip device memory component 624 can include global memory and/or constant and texture memory. The GPU architecture can include or be communicatively coupled 601 to a CPU 604 and a CPU memory 606, which may be adapted to store computer-readable instructions and data for performing the activity of the CPU 604. The CPU 604 may be in operative communication with components of the GPU architecture or similar components via a bus, a network, or some other communication coupling. The CPU 604 may effect initiation and scheduling of the processes or functions performed by the GPU architecture.

The shared memory 612 is present in each SM 610.1-610.N and is organized into banks. Bank conflict occurs when multiple addresses belonging to the same bank are accessed at the same time. Each SM 610.1-610.N also has a set of registers 614.1-614.M. The constant and texture memories are read-only regions in the global memory space and they have on-chip read-only caches. Accessing constant cache 620 is faster, but it has only a single port and hence it is beneficial when multiple processor cores load the same value from the cache. Texture cache 624 has higher latency than constant cache 620, but it does not suffer greatly when memory read accesses are irregular, and it is also beneficial for accessing data with two-dimensional (2D) spatial locality.

The GPU computing architecture can employ a single instruction multiple threads (SIMT) model of execution. The threads in a kernel are executed in groups called warps, where a warp is a unit of execution. The scalar SPs within an SM share a single instruction unit and the threads of a warp are executed on the SPs. All the threads of a warp execute the same instruction and each warp has its own program counter. Each thread can access memories at different levels in the hierarchy, and the threads have a private local memory space and register space. The threads in a thread block can share a shared memory space, and the GPU dynamic random access memory (DRAM) is accessible by all threads in a kernel.

For memory-bound applications, such as matrix-vector multiplication, it is advantageous to optimize memory performance, such as reducing the memory footprint and implementing processing strategies that better tolerate memory access latency. Many optimization strategies have been developed to handle the indirect and irregular memory accesses of sparse matrix vector multiplication. SpMV-specific optimizations depend heavily on the structural properties of the sparse matrix, and the problem is often formulated as one in which these properties are known only at run-time. However, sparse matrices in the present disclosure benefit from a well-defined structure that is known before run-time, and this structure can remain the same for many data sets. This simplifies the problem and thereby enables better-performing solutions. When a sparse weight vector is employed, the matrix-vector multiplication can be modeled as SpMV with a corresponding sparse operator matrix. For example, matrix elements that multiply only zero-value vector elements can be set to zero to provide a sparse matrix. If the sparse weight vector w is predetermined and is irrespective of the data symbols X and the operator matrix, then the structural properties of the sparse operator matrix are known before run-time, and the hardware and software acceleration strategies can be more precisely defined.

The optimal memory access pattern is also dependent on the manner in which threads are mapped for computation and also on the number of threads involved in global memory access, as involving more threads would assist in hiding the global memory access latency. Consequently, thread mapping schemes have been developed to ensure optimized memory access. Memory optimization may be based on the CSR format, and the CSR storage format can be adapted to suit the GPU architecture.

Some aspects can exploit synchronization-free parallelism. In SpMV computation, the parallelism available across rows enables distribution of computations corresponding to a row or a set of rows to a thread block as opposed to allocating one thread to perform the computation corresponding to one row and a thread block to handle a set of rows. A useful access strategy for global memory is the hardware-optimized coalesced access pattern when consecutive threads of a half-warp access consecutive elements. For example, when all the words requested by the threads of a half-warp lie within the same memory segment, and if consecutive threads access consecutive words, then all the memory requests of the half-warp are coalesced into one memory transaction.

One strategy maps multiple threads per row such that consecutive threads access consecutive non-zero elements of the row in a cyclic fashion to compute partial products corresponding to the non-zero elements. The threads mapped to a row can compute the output vector element corresponding to the row from the partial products through parallel sum reduction. The partial products can be stored in shared memory as they are accessed only by threads within a thread block.

Some techniques exploit data locality and reuse. The input and output vectors can exhibit data reuse in SpMV computation. The reuse of output vector elements can be achieved by exploiting synchronization-free parallelism with optimized thread mapping, which ensures that partial contributions to each output vector element are computed only by a certain set of threads and the final value is written only once. The reuse pattern of input vector elements depends on the non-zero access pattern of the sparse matrix.

Exploiting data reuse of the input vector elements within a thread or among threads within a thread block can be achieved by caching the elements in on-chip memories. The on-chip memory may be, for example, texture (hardware) cache, registers, or shared memory (software) cache. Utilizing registers or shared memory to cache input vector elements can include identifying portions of a vector that are reused, which in turn, requires the identification of dense sub-blocks in the sparse matrix. For a predetermined set of sparse weight vectors, this information is already known. Preprocessing of the sparse matrix can be performed to extract dense sub-blocks, and a block storage format can be implemented that suits the GPU architecture (e.g., enables fine-grained thread-level parallelism). If the sequence length of the data symbols does not vary, then the sub-block size remains constant, which avoids the memory access penalty for reading block size and block index, as is typically required in SpMV optimizations.

Techniques described herein can include tuning configuration parameters, such as varying the number of threads per thread block used for execution and/or varying number of threads handling a row. To achieve high parallelism and to meet latency constraint, the SpMV can include multiple buffers. In one aspect, SpMV may include two sparse matrix buffers, two pointer buffers, and two output buffers. Two sparse matrix buffers are configured in alternate buffer mode for buffering sparse matrix coefficients, two pointer buffers are configured in alternate buffer mode for buffering pointers representing non-zero coefficient start positions in each column of the sparse matrix, while two output buffers are configured in alternate buffer mode to output the calculation result from one output buffer while the other output buffer is used to buffer the calculation result.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a client-side, server-side, and/or intermediate device. In the alternative, the processor and the storage medium may reside as discrete components in a client-side, server-side, and/or intermediate device.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies, such as infrared, radio, and microwave are included in the definition of medium. Combinations of the above should also be included within the scope of computer-readable media. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The invention claimed is:

1. A method for reducing a peak-to-average power ratio (PAPR) of a discrete-time orthogonal frequency division multiplexing (OFDM) signal by selecting a signal with low PAPR from a plurality of candidate discrete-time OFDM signals, the method comprising:
   generating a partial update discrete-time OFDM signal by performing a sparse invertible transform operation on a base data symbol sequence; and
   linearly combining a base discrete-time OFDM signal and the partial update discrete-time OFDM signal to produce an updated discrete-time OFDM signal, the updated discrete-time OFDM signal being designated as one of the plurality of candidate discrete-time OFDM signals;
   wherein the base discrete-time OFDM signal is generated by performing a dense invertible transform operation on the base data symbol sequence or is selected from a previous updated discrete-time OFDM signal.

2. The method of claim 1, wherein the sparse invertible transform operation comprises at least one of a sparse inverse fast Fourier transform (IFFT), a wavelet-based approximate IFFT, a sparse matrix-vector multiplication, a sparse-matrix sparse vector multiplication, or a matrix sparse-vector multiplication.

3. The method of claim 1, further comprising generating at least one additional partial update discrete-time OFDM signal by at least one of linear combining a first partial update discrete-time OFDM signal with a second partial update discrete-time OFDM signal, or multiplying the partial update discrete-time OFDM signal with a complex-value scaling factor.

4. The method of claim 1, wherein performing the sparse invertible transform operation includes at least one of:
   performing a component-wise multiplication of the base data symbol sequence with a sparse weight matrix to generate a sparse update symbol sequence, and performing an invertible transform operation on the sparse update symbol sequence;
   employing the sparse weight matrix to select at least one block of elements in a dense invertible transform operator to produce a sparse invertible transform operator, and using the sparse invertible transform operator to operate on the base data symbol sequence; or
   selecting at least one block of elements in the dense invertible transform operator to produce the sparse invertible transform operator, selecting at least one element in the base data symbol sequence to produce the sparse update symbol sequence, and using the sparse invertible transform operator to operate on the sparse update symbol sequence.

5. The method of claim 1, wherein performing the sparse invertible transform operation comprises optimizing the sparse invertible transform operation to run on a graphics processing unit.

6. The method of claim 1, wherein the PAPR comprises a sum of PAPRs scaled with weights, each weight comprising a measure of PAPR sensitivity for a corresponding antenna or node.

7. The method of claim 1, further comprising transmitting side information indicating a selected one of the plurality of candidate discrete-time OFDM signals to enable a receiver to decode the selected one of the plurality of candidate discrete-time OFDM signals.

8. An apparatus for reducing a peak-to-average power ratio (PAPR) of a discrete-time signal by selecting a signal with low PAPR from a set of candidate discrete-time signals, comprising:
   a memory; and one or more processors operatively coupled to the memory, the one or more processors configured to:
      generate a partial update discrete-time signal by performing a sparse transform operation on a base data symbol sequence; and
      linearly combine a base discrete-time signal and the partial update discrete-time signal to produce an updated discrete-time signal, the updated discrete-time signal being included in the set of candidate discrete-time signals;
   wherein the base discrete-time OFDM signal is generated by performing a dense invertible transform operation on the base data symbol sequence or is selected from a previous updated discrete-time OFDM signal.

9. The apparatus of claim 8, wherein the sparse transform operation comprises at least one of a sparse inverse fast Fourier transform (IFFT), a wavelet-based approximate IFFT, a sparse matrix-vector multiplication, a sparse-matrix sparse vector multiplication, or a matrix sparse-vector multiplication.

10. The apparatus of claim 8, wherein the one or more processors are configured for generating at least one additional partial update discrete-time signal by at least one of linear combining a first partial update discrete-time signal with a second partial update discrete-time signal, or multiplying the partial update discrete-time signal with a complex-value scaling factor.

11. The apparatus of claim 8, wherein performing a sparse transform operation comprises at least one of:
   performing a component-wise multiplication of the base symbol sequence with a sparse weight matrix to generate a sparse update symbol sequence, and performing an invertible transform operation on the sparse update symbol sequence;

employing the sparse weight matrix to select at least one block of elements in a dense invertible transform operator to produce a sparse transform operator, and using the sparse transform operator to operate on the base symbol sequence; or selecting at least one block of elements in the dense invertible transform operator to produce the sparse transform operator, selecting at least one element in the base symbol sequence to produce the sparse update symbol sequence, and using the sparse transform operator to operate on the sparse update symbol sequence.

12. The apparatus of claim 8, wherein the PAPR comprises a sum of PAPRs scaled with weights, each weight comprising a measure of PAPR sensitivity for at least one of a corresponding antenna or node.

13. The apparatus of claim 8, wherein performing the sparse transform operation comprises optimizing the sparse transform operation to run on a graphics processing unit.

14. The apparatus of claim 8, wherein the one or more processors are configured to provide for transmitting side information indicating a selected one of the candidate discrete-time signals to enable a receiver to decode the elected one of the candidate discrete-time signals.

15. A non-transitory computer-readable medium storing one or more instructions for reducing a peak-to-average power ratio (PAPR) of a transmitted discrete-time signal by selecting a signal with low PAPR from a set of candidate discrete-time signals, the one or more instructions, when executed by one or more processors, cause the one or more processors to:

generate a partial update discrete-time signal by performing a sparse transform operation on a base data symbol sequence; and linearly combine a base discrete-time signal and the partial update discrete-time signal to produce an updated discrete-time signal, the updated discrete-time signal being included in the set of candidate discrete-time signals;

wherein the base discrete-time OFDM signal is generated by performing a dense invertible transform operation on the base data symbol sequence or is selected from a previous updated discrete-time OFDM signal.

16. The non-transitory computer-readable medium of claim 15, wherein the sparse transform operation comprises at least one of a sparse inverse fast Fourier transform (IFFT), a wavelet-based approximate IFFT, a sparse matrix-vector multiplication, a sparse-matrix sparse vector multiplication, or a matrix sparse-vector multiplication.

17. The non-transitory computer-readable medium of claim 15, wherein the one or more instructions, when executed by the one or more processors, cause the one or more processors to generate at least one additional partial update discrete-time signal by at least one of linear combining a first partial update discrete-time signal with a second partial update discrete-time signal, or multiplying the partial update discrete-time signal with a complex-value scaling factor.

18. The non-transitory computer-readable medium of claim 15, wherein performing a sparse transform operation comprises at least one of:

performing a component-wise multiplication of the base symbol sequence with a sparse weight matrix to generate a sparse update symbol sequence, and performing an invertible transform operation on the sparse update symbol sequence;

employing the sparse weight matrix to select at least one block of elements in a dense invertible transform operator to produce a sparse transform operator, and using the sparse transform operator to operate on the base symbol sequence; or selecting at least one block of elements in the dense invertible transform operator to produce the sparse transform operator, selecting at least one element in the base symbol sequence to produce the sparse update symbol sequence, and using the sparse transform operator to operate on the sparse update symbol sequence.

19. The non-transitory computer-readable medium of claim 15, wherein the PAPR comprises a sum of PAPRs scaled with weights, each weight comprising a measure of PAPR sensitivity for at least one of a corresponding antenna or node.

20. The non-transitory computer-readable medium of claim 15, wherein performing the sparse transform operation comprises optimizing the sparse transform operation to run on a graphics processing unit.

21. The non-transitory computer-readable medium of claim 15, wherein the one or more instructions, when executed by the one or more processors, cause the one or more processors to provide for transmitting side information indicating a selected one of the candidate discrete-time signals to enable a receiver to decode the transmitted discrete-time signal.

* * * * *